US011136475B2

(12) United States Patent
Constantinou

(10) Patent No.: US 11,136,475 B2
(45) Date of Patent: Oct. 5, 2021

(54) ARTICLES AND COMPONENTS WITH UV RADIATION CURABLE ELASTOMERIC MATERIALS AND METHODS OF MAKING THE SAME

(71) Applicant: NIKE, Inc., Beaverton, OR (US)

(72) Inventor: Jay Constantinou, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 120 days.

(21) Appl. No.: 15/959,563

(22) Filed: Apr. 23, 2018

(65) Prior Publication Data
US 2018/0305581 A1 Oct. 25, 2018

Related U.S. Application Data

(60) Provisional application No. 62/583,019, filed on Nov. 8, 2017, provisional application No. 62/547,986, filed
(Continued)

(51) Int. Cl.
C09J 5/06 (2006.01)
A43B 13/04 (2006.01)
(Continued)

(52) U.S. Cl.
CPC .............. C09J 5/06 (2013.01); A43B 1/10 (2013.01); A43B 1/14 (2013.01); A43B 13/04 (2013.01);
(Continued)

(58) Field of Classification Search
CPC .. A43B 1/10; A43B 1/14; A43B 13/04; A43B 13/14; A43B 13/223; A43B 23/025;
(Continued)

(56) References Cited

U.S. PATENT DOCUMENTS 2,684,305 A 7/1954 Quinlivan
3,250,840 A * 5/1966 Procopio ............... C08G 18/10
264/175
(Continued)

FOREIGN PATENT DOCUMENTS

CN 1085756 A 4/1994
CN 102529287 A 7/2012
(Continued)

OTHER PUBLICATIONS

International Search Report for PCT/US2018/028812 dated Jul. 10, 2018.
(Continued)

Primary Examiner — Daniel McNally
(74) Attorney, Agent, or Firm — Thomas|Horstemeyer, LLP

(57) ABSTRACT

A method of manufacturing an article that includes providing an element formed of an elastomeric material or composite; placing the surface of the element in contact with a substrate; and affixing the element to the substrate. The element includes an uncured, partially cured, or fully cured UV radiation curable elastomeric material and optionally one or more regions of an adhesive material. The element is affixed to the substrate while the surface of the element is in contact with a surface of the substrate by increasing a temperature of at least a portion of the element, applying pressure to at least a portion of the element, or exposing the uncured or partially cured UV radiation curable material to UV radiation in an amount and for a duration of time that is sufficient to partially cure the uncured material or to fully cure the partially cured material.

19 Claims, 9 Drawing Sheets

Related U.S. Application Data on Aug. 21, 2017, provisional application No. 62/488,978, filed on Apr. 24, 2017, provisional application No. 62/488,971, filed on Apr. 24, 2017.

(51) Int. Cl.

| | | |
|---|---|---|
| *A43B 13/14* | (2006.01) | |
| *A43B 23/02* | (2006.01) | |
| *A43B 13/22* | (2006.01) | |
| *A43B 1/10* | (2006.01) | |
| *B29D 35/06* | (2010.01) | |
| *A43B 1/14* | (2006.01) | |
| *B29D 35/12* | (2010.01) | |
| *B29D 35/00* | (2010.01) | |
| *B29D 35/14* | (2010.01) | |
| *B29D 35/08* | (2010.01) | |
| *B29K 675/00* | (2006.01) | |
| *A43B 13/12* | (2006.01) | |
| *A41D 19/00* | (2006.01) | |
| *A43C 15/02* | (2006.01) | |
| *A43C 15/16* | (2006.01) | |
| *A41B 1/08* | (2006.01) | |
| *B29K 75/00* | (2006.01) | |
| *B29K 667/00* | (2006.01) | |

(52) U.S. Cl.
CPC ............ *A43B 13/14* (2013.01); *A43B 13/223* (2013.01); *A43B 23/025* (2013.01); *B29D 35/0054* (2013.01); *B29D 35/0063* (2013.01); *B29D 35/065* (2013.01); *B29D 35/067* (2013.01); *B29D 35/085* (2013.01); *B29D 35/122* (2013.01); *B29D 35/124* (2013.01); *B29D 35/126* (2013.01); *B29D 35/142* (2013.01); *B29D 35/144* (2013.01); *B29D 35/146* (2013.01); *A41B 1/08* (2013.01); *A41D 19/0044* (2013.01); *A41D 19/0051* (2013.01); *A43B 13/122* (2013.01); *A43B 23/0255* (2013.01); *A43C 15/02* (2013.01); *A43C 15/16* (2013.01); *B29K 2075/00* (2013.01); *B29K 2667/003* (2013.01); *B29K 2675/00* (2013.01); *B29K 2713/00* (2013.01); *C09J 2301/304* (2020.08); *C09J 2301/416* (2020.08); *C09J 2400/263* (2013.01); *C09J 2475/006* (2013.01)

(58) Field of Classification Search
CPC .... C09J 5/06; B29D 35/0054; B29D 35/0063; B29D 35/0065; B29D 35/067; B29D 35/085; B29D 35/122; B29D 35/124; B29D 35/126; B29D 35/142; B29D 35/144; B29D 35/146

See application file for complete search history.

(56) References Cited

U.S. PATENT DOCUMENTS

| | | | |
|---|---|---|---|
| 5,275,372 A | | 1/1994 | Boeckeler |
| 5,389,176 A | * | 2/1995 | Nakanishi ............ A43B 1/0036 156/242 |
| 5,632,057 A | | 5/1997 | Lyden |
| 5,763,049 A | | 6/1998 | Frey et al. |
| 6,551,531 B1 | | 4/2003 | Ford et al. |
| 7,695,668 B2 | | 4/2010 | Takahashi et al. |
| 7,732,513 B2 | | 6/2010 | Jimbo |
| 8,109,757 B1 | | 2/2012 | Fusi, III |
| 8,344,070 B2 | | 1/2013 | Squire et al. |
| 8,398,903 B2 | | 3/2013 | Hagmann et al. |
| 2002/0018281 A1 | | 2/2002 | Theiste et al. |
| 2004/0004300 A1 | | 1/2004 | Yamaguchi et al. |
| 2004/0087754 A1 | * | 5/2004 | Foley ................... C08G 18/757 528/59 |
| 2004/0143034 A1 | * | 7/2004 | Primke ..................... B29B 9/10 523/176 |
| 2005/0056954 A1 | | 3/2005 | Devlin et al. |
| 2006/0194707 A1 | | 8/2006 | Lu |
| 2007/0204482 A1 | | 9/2007 | Gibson-Collinson |
| 2008/0033112 A1 | | 2/2008 | Squire et al. |
| 2009/0302507 A1 | | 12/2009 | Tsunozaki et al. |
| 2012/0021151 A1 | | 1/2012 | Tatarka et al. |
| 2013/0134636 A1 | | 5/2013 | Schneider et al. |
| 2014/0020192 A1 | | 1/2014 | Jones et al. |
| 2014/0310986 A1 | * | 10/2014 | Tamm .................. A43B 13/187 36/84 |
| 2014/0320986 A1 | | 10/2014 | You |
| 2016/0021969 A1 | * | 1/2016 | Lettow, II ................ A43B 1/14 36/87 |
| 2016/0103255 A1 | | 4/2016 | Powell et al. |
| 2016/0227876 A1 | | 8/2016 | Le et al. |
| 2016/0295971 A1 | * | 10/2016 | Arnese ............... B29D 35/0009 |
| 2016/0362552 A1 | * | 12/2016 | Reichel ................ B29C 48/022 |
| 2019/0329457 A1 | | 10/2019 | Miyake et al. |

FOREIGN PATENT DOCUMENTS

| | | |
|---|---|---|
| CN | 103561929 A | 2/2014 |
| CN | 104859277 A | 8/2015 |
| CN | 106418874 A | 2/2017 |
| DE | 19753863 A1 | 6/1998 |
| EP | 137888 A2 | 4/1985 |
| EP | 1378898 A1 | 1/2004 |
| EP | 1434211 A1 | 6/2004 |
| EP | 1484148 A1 | 12/2004 |
| EP | 1872924 A1 | 1/2008 |
| EP | 2441338 A2 | 4/2012 |
| EP | 2671703 A2 | 12/2013 |
| EP | 2838708 A2 | 2/2015 |
| EP | 3053732 A1 | 8/2016 |
| JP | H0345902 A | 2/1991 |
| JP | 2000108137 A | 4/2000 |
| WO | 200706652 A1 | 1/2007 |
| WO | 201217008 A1 | 2/2012 |
| WO | 201217008 A1 | 12/2012 |
| WO | 2014015033 A2 | 1/2014 |
| WO | 2016089462 A1 | 6/2016 |
| WO | 2017007533 A1 | 1/2017 |

OTHER PUBLICATIONS

International Search Report for PCT/US2018/028815 dated Jul. 24, 2018.
International Search Report for PCT/US2018/028817 dated Jul. 24, 2018.
International Search Report for PCT/US2018/028814 dated Sep. 6, 2018.
International Preliminary Report on Patentability for PCT/US2018/028815 dated Jul. 8, 2019.
Written Opinion of the International Preliminary Examining Authority for PCT/US2018/028815 dated Apr. 23, 2019.
International Preliminary Report on Patentability for PCT/US2018/028817 dated May 8, 2019.
International Preliminary Report on Patentability for PCT/US2018/028812 dated Aug. 7, 2019.
International Preliminary Report on Patentability for PCT/US2018/028814 dated May 8, 2019.
Written Opinion of the International Preliminary Examining Authority for PCT/US2018/028812 dated Mar. 7, 2019.
TOPAS: Cycloolefin Copolymer (COC) Brochure. TOPAS Advanced Polymers. Retrieved online Jan. 11, 2021 from https://topas.com/sites/default/files/files/topas_product-brochure_english.pdf. Published 2008. (Year: 2008).

\* cited by examiner

US 11,136,475 B2

ARTICLES AND COMPONENTS WITH UV RADIATION CURABLE ELASTOMERIC MATERIALS AND METHODS OF MAKING THE SAME

CROSS-REFERENCE TO RELATED APPLICATIONS

This application claims priority to U.S. Provisional Application No. 62/583,019 filed on Nov. 8, 2017; U.S. Provisional Application No. 62/547,986 filed on Aug. 21, 2017; U.S. Provisional Application No. 62/488,971 filed on Apr. 24, 2017; and U.S. Provisional Application No. 62/488,978 filed on Apr. 24, 2017, the entire contents of which are incorporated herein by reference.

FIELD

This disclosure relates generally to components and multilayer composites formed with uncured, partially cured, or fully cured ultraviolet (UV) radiation curable elastomeric materials that are used to form, embellish, and/or customize articles of apparel or sporting equipment. More specifically, this disclosure relates to UV radiation curable elastomeric materials and multilayer composites that include one or more layers of an UV radiation curable elastomeric material formed with or without the incorporation of an adhesive.

BACKGROUND

The statements in this section merely provide background information related to the present disclosure and may not constitute prior art.

Conventional articles may include a combination of materials, such as the use of elastomeric materials attached to various textile materials. For example, footwear normally includes both an upper, an outsole, and optionally, one or more of an insole or midsole. The upper, which may be made from a textile, generally forms an interior void that securely and comfortably receives a foot. The outsole, in which at least a portion thereof may be fashioned from a durable elastomeric material, is secured to the upper and generally positioned to be between the foot and the ground. The outsole may attenuate ground reaction forces and provide traction, as well as limit potentially harmful foot motion. Accordingly, the upper and outsole operate together to provide a comfortable structure that is well suited for use in a wide variety of activities. In this respect, the strength of the attachment that exists between the upper and the sole structure may correlate with the durability and overall lifetime expected for the footwear.

DRAWINGS

In order that the disclosure may be well understood, there will now be described various forms thereof, given by way of example, reference being made to the accompanying drawings, in which.

Figure 1A:
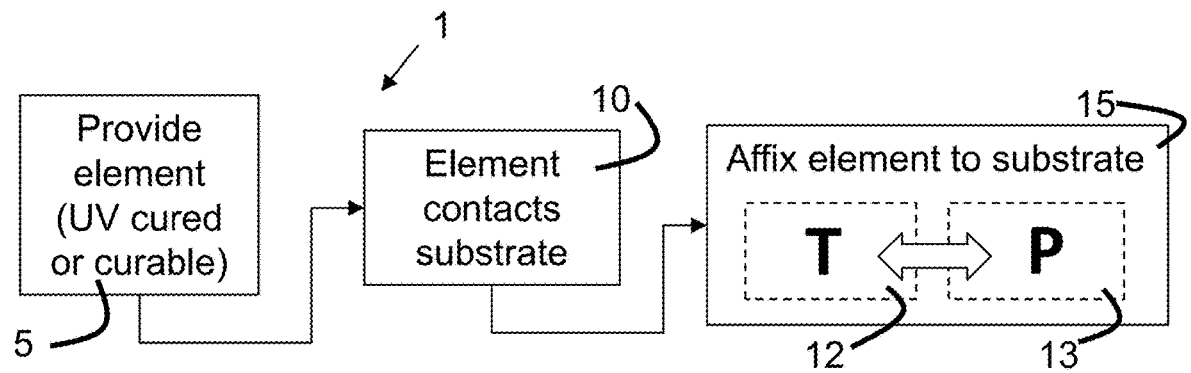
FIG. 1A is a flow chart of a method of manufacturing an article according to the teachings of the present disclosure.

The drawings described herein are for illustration purposes only and are not intended to limit the scope of the present disclosure in any way.

DETAILED DESCRIPTION

The use of ultraviolet (UV) radiation curable elastomeric materials to form or at least partially form an article or a component of an article offers multiple benefits to a manufacturing operation. More specifically, the use of such materials may increase productivity, lower costs associated with the fabrication of equipment and tooling, lower energy costs, and induce less part shrinkage due to low curing temperatures and faster cure times. In addition, the use of articles or components of articles formed from UV radiation curable materials also provide advantages over conventional articles in that components comprising the UV radiation curable materials disclosed herein can be affixed to each other or to other materials using an adhesive material, and/or by curing the UV radiation curable material of the component(s) while in contact with each other or while in contact with other materials.

Despite the various models and characteristics available for various articles, such as conventional footwear, new models and constructions that comprise different materials and means of attachment between the materials are continually desired in order to provide for further development and advancement in the art.

The present disclosure generally provides a method of manufacturing an article by providing an element formed of an elastomeric material. The elastomeric material includes an uncured ultraviolet (UV) radiation curable elastomeric material, a partially cured UV radiation curable elastomeric material, or a fully cured UV radiation cured elastomeric material. As used herein, the terms "fully cured UV radiation cured material" and "fully cured UV radiation curable material" are understood to be synonymous, and to refer to a polymeric material which has been fully cured and which has been cured using UV radiation. The surface of the element is placed in contact with a substrate and affixed to the substrate by forming a bond between the surface of the element and the surface of the substrate. This may be accomplished by increasing a temperature of at least a portion of the element, applying pressure to at least a portion of the element, or both, while the surface of the element is in contact with a surface of the substrate.

When the element includes at least a portion of a surface that comprises, consists of, or consists essentially of the uncured UV radiation curable elastomeric material or the partially cured UV radiation curable elastomeric material, the placing of this surface of the element in contact with a surface of a substrate may be performed prior to applying pressure and affixing the surface of the element to the surface of the substrate is performed concurrently with or following the application of pressure. The affixing includes exposing at least a portion of the surface of the element to UV radiation in a sufficient amount for a sufficient duration of time to at least partially cure the uncured UV radiation curable elastomeric material or to fully cure the partially cured UV radiation curable elastomeric material of the element, thereby forming chemical bonds between the partially cured or fully cured UV radiation curable elastomeric material of the element and material of the substrate.

When the element includes the partially cured UV radiation curable elastomeric material or the fully cured UV radiation curable elastomeric material, the element may further include an adhesive material that defines at least a portion of the surface of the element. The increasing the temperature of the at least a portion of the surface of the element is performed concurrently with or prior to placing the surface of the element in contact with the surface of the substrate. The forming the bond between the surface of the element and the surface of the substrate comprises applying pressure to the at least a portion of the surface of the element when a temperature of the at least a portion of the surface of the element is above a melting point of the adhesive material while the at least a portion of the element is in contact with the surface of the substrate, and subsequently decreasing the temperature of the at least a portion of the surface of the element to a temperature below the melting point of the adhesive material while the at least a portion of the surface of the element remains in contact with the surface of the substrate, thereby forming a physical bond between the adhesive material of the element and material of the substrate.

An article may be formed using this method that comprises an element formed of an elastomeric material that includes an uncured ultraviolet (UV) radiation curable elastomeric material, a partially cured UV radiation curable elastomeric material, or a fully cured UV radiation curable elastomeric material. In this article, the element includes a surface that is affixed to a surface of a substrate.

According to another aspect of the present disclosure, another method of forming an article comprises providing an element having a shape that includes a surface, such that at least a portion of the surface of the element is defined by an uncured or partially cured ultraviolet (UV) radiation curable elastomeric material. At least portion of the surface of the element is placed in contact with a surface of a substrate and applying pressure and UV radiation thereto, in order to affix at least a portion of the surface of the element to the surface of the substrate by forming a bond between the surface of the element and the surface of the substrate. The application of UV radiation to the portion of the surface of the element includes applying a sufficient amount of UV radiation for a sufficient duration of time to at least partially cure the uncured UV radiation curable elastomeric material or to fully cure the partially cured UV radiation curable elastomeric material of the portion of the surface of the element.

An article formed according to this method may comprise an element having a shape and including a surface in which at least a portion of the surface of the element is defined by a fully cured or partially cured UV radiation curable elastomeric material. The article further includes a substrate having a surface; wherein the at least a portion of the surface of the element and the surface of the substrate are affixed to each other by bonds formed by exposure to UV radiation of a precursor material to the fully cured or partially cured UV radiation curable elastomeric material.

According to another aspect of the present of the present disclosure, another method of manufacturing an article is provided. This method generally provides an element formed of a composite, wherein the composite comprises a first region formed of fully cured or partially cured UV radiation curable elastomeric material affixed to a second region formed of an adhesive material in which the adhesive material defines at least a portion of a surface of the element. The surface of the element that is defined by the layer of adhesive material is placed in contact with a surface of a substrate. The element is affixed to the substrate by increasing a temperature of at least a portion of the surface of the element above a melting point of the adhesive material, while the at least a portion of the element is in contact with the surface of the substrate, thereby, forming a bond between the surface of the element and the surface of the substrate. When desirable, the method may further include affixing the element of the substrate by applying pressure to at least a portion of the adhesive material of the composite, while the at least a portion of the adhesive material is in contact with the surface of the substrate.

The article formed according to this method comprises an element formed of a composite and a substrate. The composite has a first region formed of fully cured or partially cured UV radiation curable elastomeric material affixed to a second region formed of an adhesive material. This second region, which is formed of the adhesive material, defines at least a portion of a surface of the element. The substrate includes a surface; such that the at least a portion of the surface of the element and the surface of the substrate are affixed to each other by the adhesive material.

According to another aspect of the present disclosure, a method of forming a cured composite is provided. This method comprises providing an uncured or partially cured UV radiation curable elastomeric material; shaping the uncured or partially cured UV radiation curable elastomeric material to have a surface and affixing one or more regions of an adhesive material to the surface of the uncured or partially cured UV radiation curable elastomeric material to form an uncured composite. At least a portion of the uncured composite is exposed to UV radiation a sufficient amount for a sufficient duration of time to partially cure the uncured UV radiation curable elastomeric material or to fully cure the partially cured UV radiation curable elastomeric material, thereby forming the cured composite.

The cured composite formed by this method comprises a fully cured or partially cured UV radiation curable elastomeric material having a shape and a surface; and one or more regions of an adhesive material affixed to the surface. The one or more regions of the adhesive material are affixed to the surface by bonds formed by exposure to UV radiation of a precursor material to the fully cured or partially cured UV radiation curable elastomeric material.

According to yet another aspect of the present disclosure, another method of forming an article is provided. This method includes providing an element comprising a cured composite that includes a fully cured or partially cured ultraviolet (UV) radiation curable elastomeric material with one or more regions of an adhesive material at least partially defining a surface of the element. A substrate having a surface is provided and at least one region of the adhesive material of the element is placed in contact with the surface of the substrate. At least one region of the surface of the element is affixed to the surface of the substrate by increasing the temperature of the at least one region of the element or applying pressure to the at least one region of the element or both while the at least one region of the element and the surface of the substrate are in contact, thereby, forming a bond between the at least one region of the element and the substrate, thereby forming the article.

For the purpose of this disclosure, the term "partially cured" is intended to denote the occurrence of at least about 1%, alternatively, at least about 5% of the total polymerization required to achieve a substantially full cure. The term "fully cured" is intended to mean a substantially full cure in which the degree of curing is such that the physical properties of the UV radiation curable material do not noticeably change upon further exposure to additional UV radiation.

Further areas of applicability will become apparent from the description provided herein. It should be understood that the description and specific examples are intended for purposes of illustration only and are not intended to limit the scope of the present disclosure.

The following description is merely exemplary in nature and is in no way intended to limit the present disclosure or its application or uses. For example, the multilayer composite comprising an ultraviolet (UV) curable material and one or more layers of an adhesive material made and used according to the teachings contained herein is described throughout the present disclosure in conjunction with footwear in order to more fully illustrate the composition and the use thereof. The incorporation and use of such a multilayer composite in other applications, including apparel such as garments, sporting equipment, or the like, as well as components thereof, are contemplated to be within the scope of the present disclosure. It should be understood that throughout the description, corresponding reference numerals indicate like or corresponding parts and features.

The article of footwear or shoe of the present disclosure may be designed for a variety of uses, such as sporting, athletic, military, work-related, recreational, or casual use. The article of footwear may be used outdoors on paved or unpaved surfaces (in part or in whole), such as on a ground surface including one or more of grass, turf, gravel, sand, dirt, clay, mud, and the like, intended for the performance of an athletic competition or as a general outdoor surface. The article of footwear may also be desirably used with indoor activities, such as indoor sports, shopping, and everyday work.

The present disclosure generally provides a method of manufacturing an article or a component of an article that includes or incorporates an ultraviolet (UV) radiation curable material. Referring to FIG. 1, this method 1 comprises, consists of, or consists essentially of providing 5 an element having a surface and formed of an elastomeric material. This elastomeric material includes an uncured ultraviolet (UV) radiation curable elastomeric material, a partially cured UV radiation curable elastomeric material, or a fully cured UV radiation curable elastomeric material. The surface of the element is placed 10 in contact with a surface of a substrate. The temperature of at least a portion of the surface of the element is increased 12, pressure is applied 13 to at least a portion of the surface of the element, or both. The surface of the element is affixed 15 to the surface of the substrate by forming a bond between the surface of the element and the surface of the substrate, thereby forming the article.

For the purpose of the present disclosure, an elastomeric material may be defined as a reaction product derived from the curing of a light-activated resin (e.g., an uncured ultraviolet (UV) radiation curable material) by exposure to ultraviolet radiation, wherein the end-result is the formation of a thermoset or cross-linked polymer network in a partially cured UV radiation curable material or fully cured UV radiation curable elastomeric material. Thus, the UV radiation curable material may be described as being an UV radiation curable elastomer or UV radiation curable elastomeric material. Alternatively, the UV radiation curable material may comprise an UV radiation curable rubber. When desirable, the UV radiation curable rubber may be a UV radiation curable polyurethane rubber.

An elastomer may be defined as a polymer having viscoelasticity (e.g., exhibiting both viscosity and elasticity) and very weak inter-molecular forces, generally having a low Young's modulus and a high failure strain compared with other materials. Elastomers may be thermoset polymers or thermoplastic polymers. Although the term "rubber" sometimes is used to interchangeably with elastomer, a rubber more typically describes a natural or synthetic thermoset polymer that has been subjected to a chemical process, such as vulcanization, that converts the polymer into a more durable elastomeric material by the addition of sulfur or other equivalent curatives and accelerators. Thus, the UV radiation curable elastomeric material may comprise one or more thermoset polymers, thermoplastic polymers, or combinations thereof. The UV radiation curable elastomeric material can be a millable urethane. When desirable, the one or more thermoplastic polymers may be one or more thermoplastic polyurethanes (TPU).

Figure 1B:
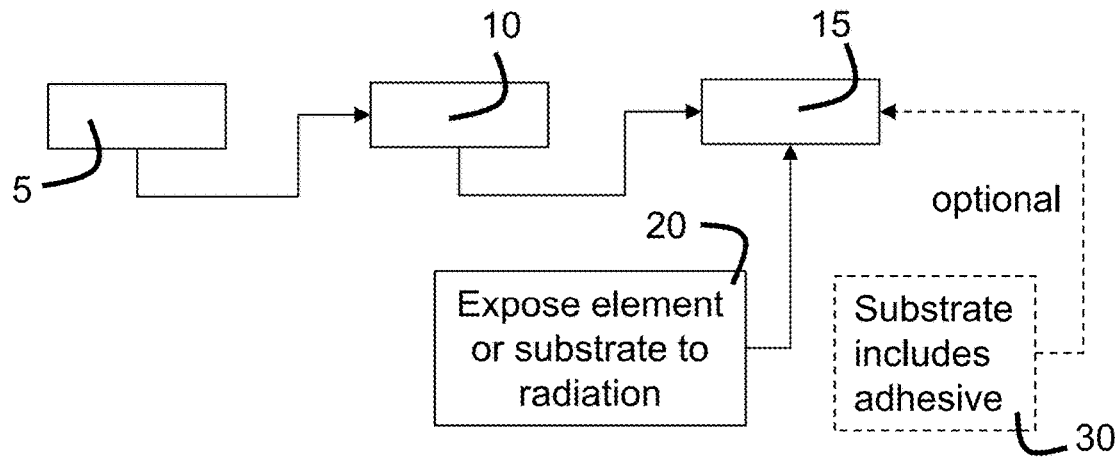
FIG. 1B is a flow chart of optional steps associated with the method of FIG. 1A.

According to one aspect of the present disclosure, at least a portion of the surface of the element may be defined by the uncured UV radiation curable elastomeric material or the partially cured UV radiation curable material. When desirable a portion of the surface of the substrate may be defined by a second uncured or partially cured UV radiation curable material. Referring now to FIG. 1B, the element may be affixed to the substrate by exposing 20 at least a portion of the element and/or substrate to UV radiation in a sufficient amount and for a sufficient duration to at least partially cure the uncured UV radiation curable material of the element and/or substrate or to fully cure the partially cured UV radiation curable material of the element and/or substrate.

Figure 2A:
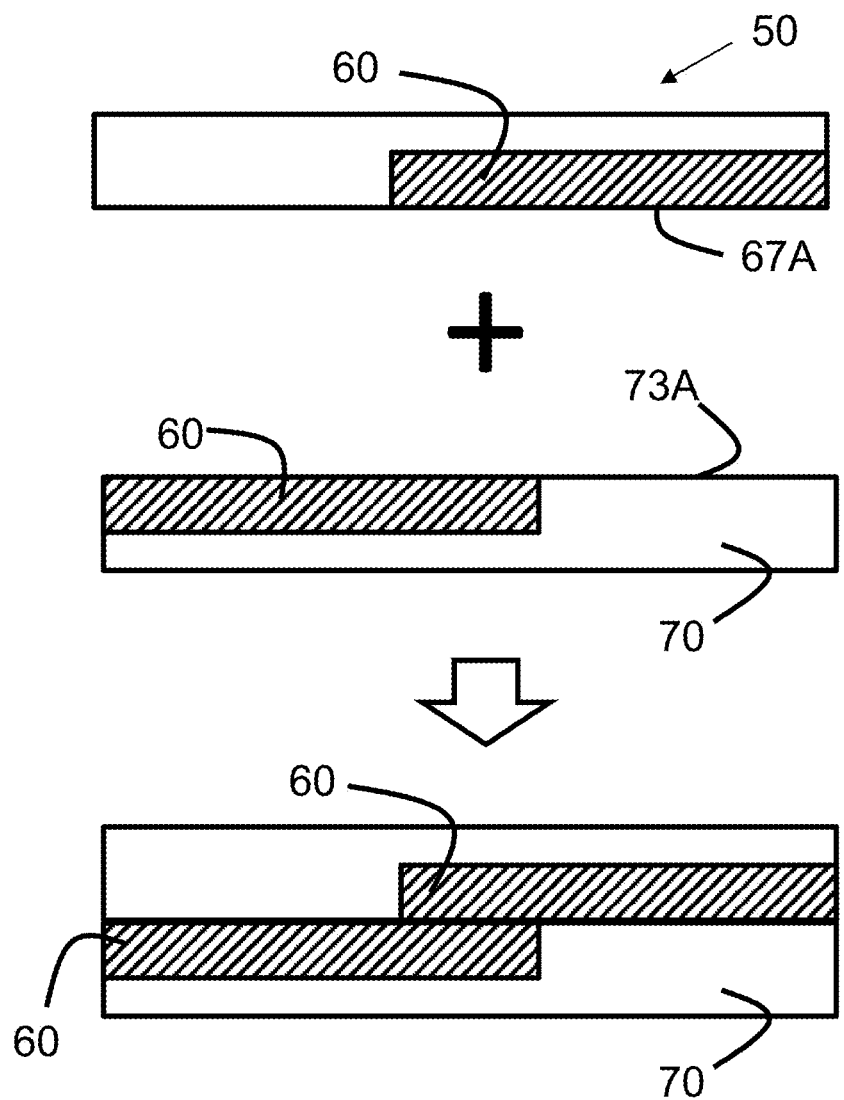
FIG. 2A is a cross-sectional view of an element comprising a UV radiation curable material used in the manufacturing of an article according to the teachings of the present disclosure.

Referring now to FIG. 2A, the element 50 may be formed of the uncured, partially cured, or fully cured UV radiation curable material 60 and have a surface 67A that can be placed against or in contact with a substrate 70 in order to attach the element 50 to the substrate 70. When the element 50 includes a layer of the uncured or partially cured UV radiation curable material 60, the element 50 may be affixed to the substrate 70 by exposing at least a portion of the element 50 to UV radiation in a sufficient amount and for a sufficient duration to at least partially cure the uncured UV radiation curable material or fully cure the partially cured UV radiation curable material. In this case, one or more chemical bonds are formed between the partially cured or fully cured UV radiation curable elastomeric material of the element and the material of the substrate.

When desirable, at least a portion of the surface 73A of the substrate 70 may also comprise a second uncured or partially cured UV radiation curable material 60. The UV radiation curable material 60 of the substrate 70 may be an elastomeric UV radiation curable material. The second uncured or partially cured UV radiation curable material may be the same or different than the uncured or partially cured UV radiation curable material of the element. In this case, the element 50 may be affixed to the substrate 70 by exposing at least a portion of the surface 73A of the substrate 70 which is defined by the second uncured or partially cured UV radiation curable material 60 of the substrate to UV radiation in a sufficient amount and for a sufficient duration to at least partially cure the second uncured UV radiation curable material 60 or fully cure the second partially cured UV radiation curable material 60 of the substrate 70.

Figure 1C:
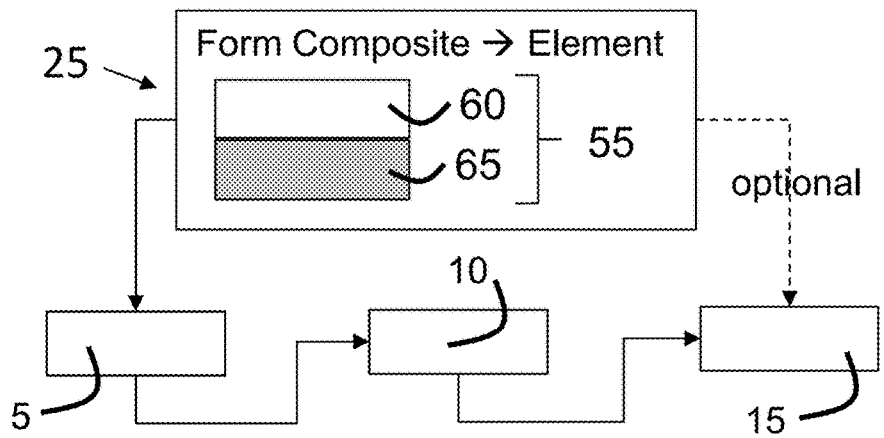
FIG. 1C is a flow chart of other optional steps associated with the method of FIG. 1A.
Figure 2B:
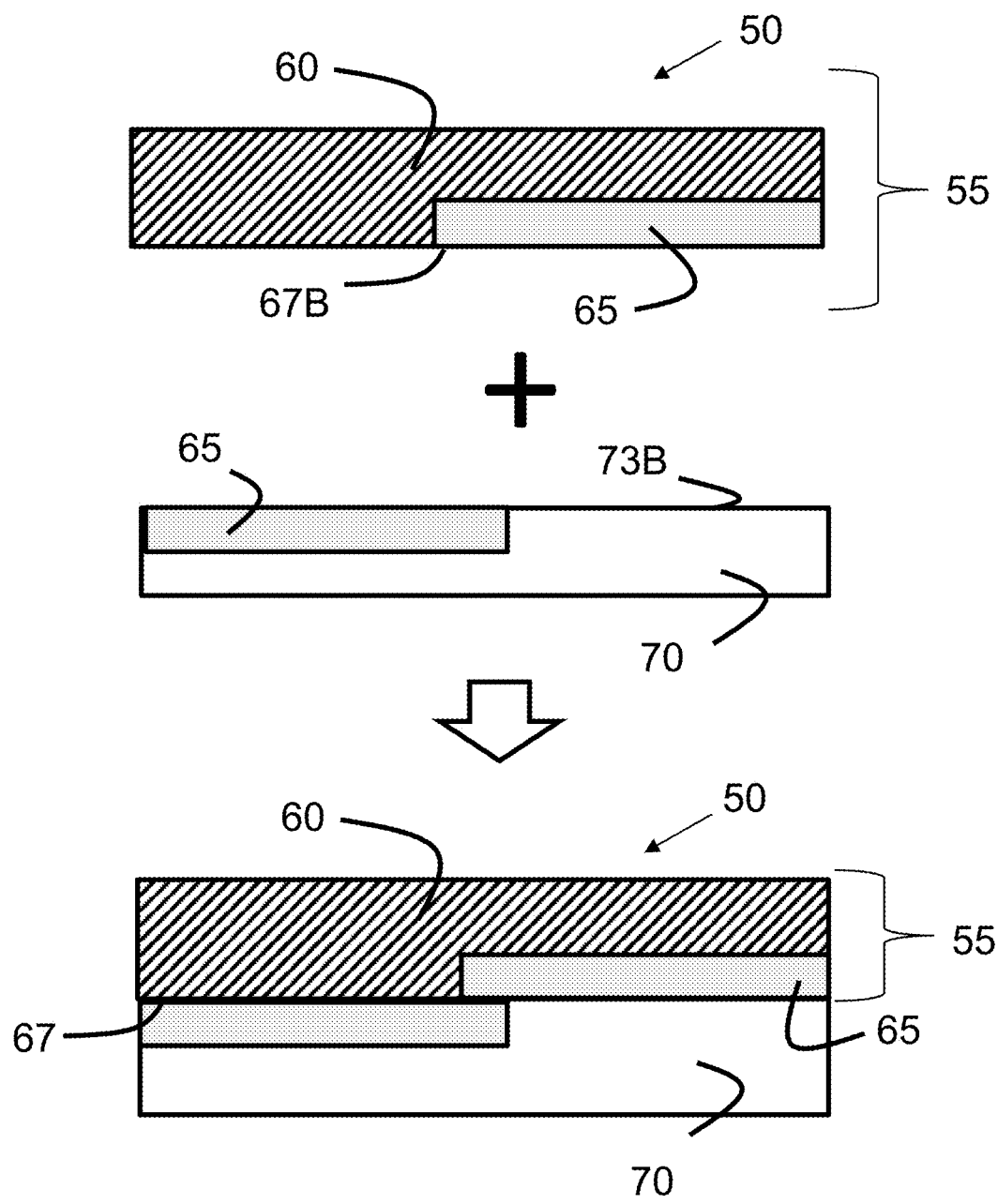
FIG. 2B is a cross-sectional view of a multilayer composite used in the manufacturing of an article according to the teachings of the present disclosure.

Referring now to FIGS. 1C and 2B, the element 50 may be formed 25 of a composite 55. The composite 55, which includes the uncured UV radiation curable elastomeric material 60, partially cured UV radiation curable elastomeric material 60, or fully cured UV radiation curable elastomeric material 60 and an adhesive material 65, such that the adhesive material 65 defines at least a portion of the surface 67B of the element 50. When desirable, at least a portion of the surface 73B of the substrate 70 may also comprise an adhesive material 65. This adhesive material 65 may include, without limitation, a thermoplastic adhesive material. The adhesive material 65 of the multilayer composite 55 may be affixed to the substrate 70 by increasing a temperature of the at least a portion of the layer of the element 50 that includes the thermoplastic adhesive material 65 above a melting point of the thermoplastic adhesive material 65, while the at least a portion of the thermoplastic adhesive material 65 is in contact with the surface 73B of the substrate 70. In this case, one or more physical bonds between the adhesive material and the material of the substrate are formed.

The multilayer composite is a composite formed by first layering the elastomeric material including the uncured UV radiation curable material or partially cured UV radiation curable material with the adhesive material, and then fully curing or partially curing the radiation curable material while in contact with the adhesive material to form the multilayer composite. The elastomeric material of the element may be partially or fully cured in contact with the adhesive material prior to placing the surface of the element that is at least partially defined by the adhesive layer in contact with the substrate.

When desirable, the surface 73B of the substrate 70 may be at least partially defined by or include 30 an adhesive material 65 as shown in FIGS. 1C and 2B. This adhesive material 65 may be a thermoplastic adhesive material. In this case, the affixing the element 55 to the substrate 70 includes increasing a temperature of at least a portion of the thermoplastic adhesive material 65 of the substrate 70 above a melting point of the thermoplastic adhesive material 65, while the at least a portion of the thermoplastic adhesive material 65 of the substrate 70 is in contact with the surface 67B of the element 55.

Figure 3A:
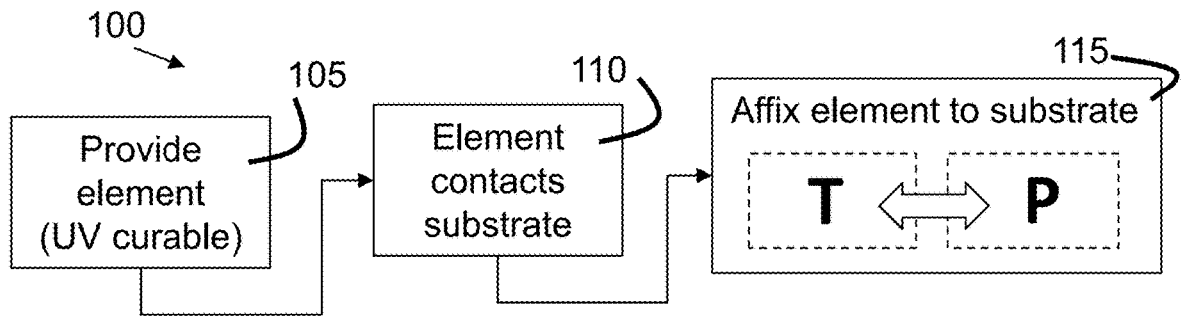
FIG. 3A is a flow chart of another method of forming an article according to the teachings of the present disclosure.

Referring now to FIG. 3A, another method 100 of forming an article generally comprises providing 105 an element having a shape and including a surface, such that a portion of the surface of the element is defined by an uncured or partially cured ultraviolet (UV) radiation curable elastomeric material. At least a portion of the surface of the element is placed in contact 110 with a surface of a substrate. The article is formed by affixing 115 at least a portion of the surface of the element to the surface of the substrate by applying pressure and UV radiation to the at least a portion of the element, thereby, forming a bond between the surface of the element and the surface of the substrate.

Figure 3B:
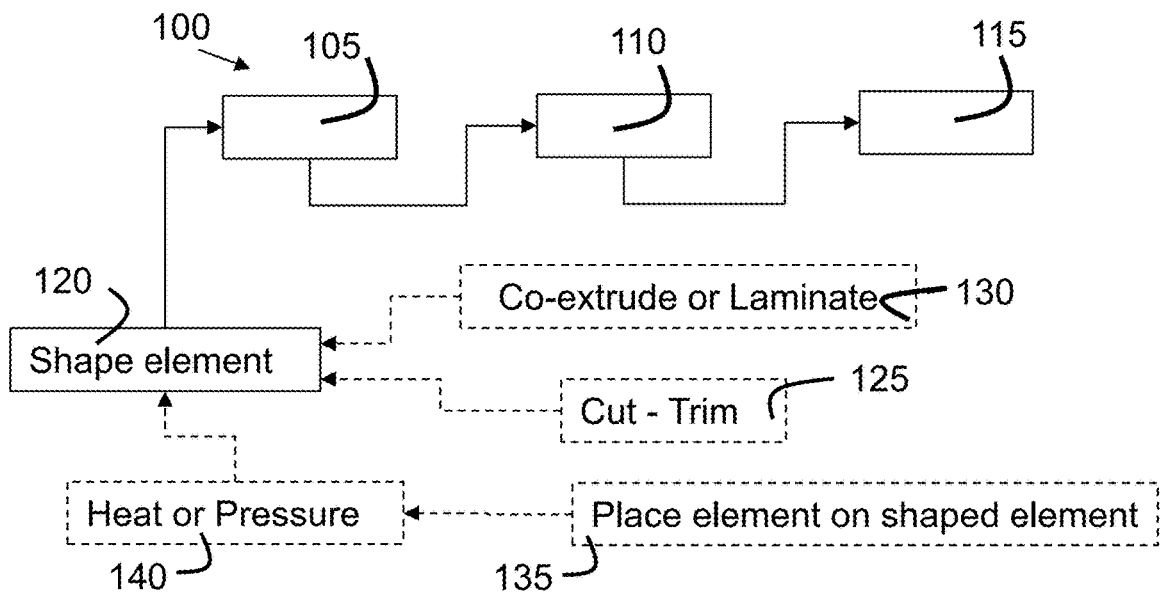
FIG. 3B is a flow chart of an optional step associated with the method of FIG. 3A.
Figure 3C:
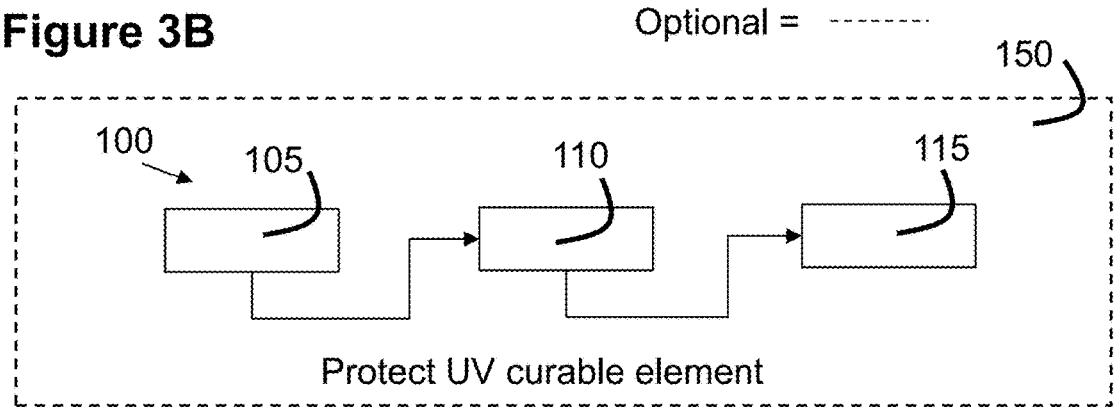
FIG. 3C is a flow chart of other optional steps associated with the method of FIG. 3A.

Referring now to FIG. 3B, this method 100 may further comprise shaping 120 the element in a process that may include, but not be limited to, cutting or trimming 125 the element. Throughout the method 100, at least a portion of the UV radiation curable material may be protected 150 from ultraviolet (UV) radiation during one or more steps of the method as shown in FIG. 3C.

The method 100 comprises the step of exposing 115 at least a portion of the uncured or partially cured UV radiation curable elastomeric material to sufficient UV radiation to at least partially cure the uncured UV radiation curable elastomeric material or fully cure the partially cured UV radiation curable elastomeric material.

Still referring to FIG. 3B, the step of shaping 120 the element may comprise, without limitation, subjecting 130 the element to a co-extrusion process or a lamination process. Thus, the element may be a multilayer sheet or film.

The shaping 120 the element may comprise placing 135 the element with the uncured or partially cured UV radiation curable elastomeric material in contact with a surface that corresponds to the shape; and using 140 heat, pressure, or both to conform the element to the shape. The surface that corresponds to the shape may be part of a compression mold.

The article formed by this method 100 generally comprises an element having a shape and including a surface, wherein at least a portion of the surface of the element is defined by a fully cured or partially cured UV radiation curable elastomeric material. The article further includes a substrate having a surface; wherein the at least a portion of the surface of the element and the surface of the substrate are affixed to each other by bonds formed by exposure to UV radiation of a precursor material to the fully cured or partially cured UV radiation curable elastomeric material.

The UV radiation curable elastomeric material generally comprises one or more photopolymers or light-activated resins that will undergo a crosslinking reaction upon exposure to ultraviolet (UV) radiation. The UV radiation curable elastomeric material may comprise a mixture of various multifunctional monomers, oligomers, and/or low molecular weight polymers or copolymers, along with one or more photoinitiator(s) that can undergo polymerization in the presence of UV radiation. Upon exposure to UV radiation, the photoinitiator decomposes into a reactive species that activates polymerization of specific functional groups that are present in the multifunctional oligomers, monomers, or polymers.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane is interpreted to include one or more polymer molecules of the polyurethane, where the polymer molecules may or may not be identical (e.g., different molecular weights).

The end-result of curing a light-activated resin in this manner is the formation of a thermoset or cross-linked polymer network in the partially cured or fully cured UV radiation curable elastomeric material. Thus the UV radiation curable elastomeric material may be described as being an UV radiation curable elastomer. Alternatively, the UV radiation curable elastomeric material may comprise an UV radiation curable rubber. The UV radiation curable elastomeric material may comprise one or more thermoset polymers, thermoplastic polymers, or combinations thereof. The UV radiation curable rubber can be a millable urethane. When desirable, the one or more thermoplastic polymers may be one or more thermoplastic polyurethanes (TPU).

Several specific examples of various monomers that may be used in the UV radiation curable elastomeric material may include, but are not limited to, styrene and styrenic compounds, vinyl ethers, N-vinyl carbazoles, lactones, lactams, cyclic ethers, cyclic acetals, and cyclic siloxanes. Several specific examples of oligomers and low molecular weight polymers or copolymers that may be incorporated into the UV radiation curable elastomeric material may include, without limitation, epoxides, urethanes, polyethers, or polyesters, each of which provide specific properties to the resulting material. Each of these oligomers or polymers may be functionalized using an acrylate. Alternatively, the UV radiation curable elastomeric material may include a mixture of urethane and acrylate oligomers or a copolymer thereof.

Photoinitiation may occur via a free radical mechanism, an ionic mechanism, or a combination thereof. Under an ionic mechanism, the polymerizable oligomers, monomers, or polymers are doped with either anionic or cationic photoinitiators. Several examples of such photoinitiators, include without limitation, onium salts, organometallic compounds, and pyridinium salts. In the free radical mechanism, the photoinitiators generate free-radicals by the abstraction of a hydrogen atom from a donor or co-initiator compound (i.e., a 2-component system), or by the cleavage of a molecule (i.e., a 1-component system). Several specific examples of abstraction type photoinitiators, include but are not limited to, benzophenone, xanthones, and quinones with common donor compounds being aliphatic amines. Several specific examples of cleavage-type photoinitiators include, without limitation, benzoin ethers, acetophenones, benzoyl oximes, and acylphosphines. Photocurable materials that form through the free-radical mechanism undergo chain-growth polymerization, which includes three basic steps: initiation, chain propagation, and chain termination. Alternatively, the photoinitiators are independently selected and may include phosphine oxides, benzophenones, a-hydroxyalkyl aryl ketones, thioxanthones, anthraquinones, acetophenones, benzoins and benzoin ethers, ketals, imidazoles, phenylglyoxylic acids, peroxides, and sulfur-containing compounds.

The amount of photoinitiators present in the UV radiation curable material is determined by the effective amount necessary to induce crosslinking of the UV radiation curable material. This amount may range from about 0.05 weight percent (wt. %) to about 5 wt. %, alternatively, from about 0.1 wt. % to about 2 wt. %, and alternatively, from about 0.2 wt. % to about 1 wt. % based on the weight of the UV radiation curable material. A single type of photoinitiator or a mixture of different photoinitiators may be used.

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

According to one aspect of the present disclosure, the UV radiation curable elastomeric material may comprise, consist of, or consist essentially of a millable polyurethane gum that includes ethylenic unsaturation, one or more photoinitiators, and at least one additional crosslinking additive that comprise two or more ethylenically unsaturated groups. The millable polyurethanes may be prepared by the reaction of a di- or polyisocyanate with bis(hydroxyl)-functional compounds, at least one of which contains ethylenic unsaturation. Alternatively, unsaturated polyester polyols may be used, alone or in combination with other isocyanate-reactive components, such as polyoxyalkylene glycols and/or diols capable of providing pendent ethylenic unsaturation. A commercial example of such a UV radiation curable material is Millathane® UV (TSE Industries Inc., Clearwater, Fla.). Further description of such a UV radiation curable material is provided in U.S. Publication No. 2016/0362552, the entire content of which is hereby incorporated by reference.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The additional crosslinking additive present in the curable polyurethane composition may include any low molecular weight compounds that contain two or more ethylenically unsaturated groups. These unsaturated groups may include, without limitation, glycerol diallyl ether, 1,6-hexanediol di(meth)acrylate, triallylisocyanurate, trimethyloipropane di(meth)acrylate, trimethyloipropane tri(meth)acrylate, glycerol di(meth)acrylate, glycerol tri(meth)acrylate, propoxylated glycerol triacrylate, 1,2-divinyltetramethyldisiloxane, divinylbenzene, and the like. The molecular weight of this additional crosslinking additive may be less than about 2000 Da, alternatively less than about 1000 Da, alternatively less than about 500 Da. The concentration of the crosslinking additive in the UV radiation curable material is selected based upon the amount of ethylenic unsaturated groups that are desired. The concentration of this additive may range from about 0.01 wt. % to about 15 wt. %, alternatively, from about 1 wt. % to about 12 wt. %, and alternatively, from about 5 wt. % to about 10 wt. % based on the overall weight of the UV radiation curable material.

When desirable, the UV radiation curable material may optionally comprise one or more additional processing aids, including without limitation, plasticizers, mold release agents, lubricants, antioxidants, flame retardants, dyes, pigments, reinforcing and non-reinforcing fillers, fiber reinforcements, and light stabilizers or UV absorbers. When an UV absorber is incorporated into the UV radiation curable material in order to enhance the environmental stability thereof, it may be necessary or desirable to use a more powerful UV light source to achieve full cure of the material, or use an UV light source having an output wavelength that is in a range within the UV spectrum at which the UV absorber exhibits a reduced level of absorbance.

The reinforcing fillers that may optionally be incorporated into the UV radiation curable material may be organic, i.e. polymeric, or inorganic in nature. These fillers may exhibit a mean, weight average particle sizes that is ≤1 μm, alternatively, in the range between about 20 nanometers (nm) to about 500 nm. Several specific examples of reinforcing fillers include, but are not limited to, pyrogenic (i.e., fumed) metal oxides, such as alumina, titania, ceria, silica, and the like; colloidal metal oxides, such as colloidal alumina or silica; carbon black and acetylene black; metal hydroxides, such as aluminum hydroxide; glass or polymer microspheres; or limestone, talc, clay, and the like. The amount of filler present in the UV radiation curable material is selected based upon the requirements associated with a particular end use. Typically, the amount of reinforcing filler present in the UV radiation curable material ranges from 0 wt. % to about 20 wt. % based on the total weight of the UV radiation curable material. Fillers having the same chemical composition may be considered to be non-reinforcing fillers when their mean, weight average particle size is greater than 1 μm, alternatively, in the range of about 2 mm to about 500 mm.

The UV radiation curable elastomeric material may be cured by irradiation with UV light transmitting a wavelength that is the same as the excitation wavelength exhibited by the photoinitiator present. The UV light may be produced from any known source, including without limitation, low, medium, or high pressure mercury vapor lamps, xenon lamps, quartz halogen lamps, or lasers operating in the short wavelength portion of the spectra, e.g., in the range of about 180 nm to about 400 nm. Several more specific examples of UV light sources include, but are not limited to, short-wave UV lamps, gas-discharge lamps, ultraviolet LEDs, UV lasers, tunable vacuum ultraviolet (VUV) obtained from sum and difference frequency mixing, or plasma and synchrotron sources of extreme UV radiation.

The duration in time that the UV radiation curable elastomeric material is irradiated with UV radiation is variable and based upon the nature and type of reactive oligomers, monomers, or polymers present in the UV radiation curable material, as well as type and concentration of the crosslinking additives, photoinitiators, and fillers, as well as the type and power associated with the available UV light source. The duration of UV exposure may range less than a second to several hours; alternatively, the exposure time is between about 1 second and about 1 hour; alternatively, between about 5 seconds and 5 minutes. The UV radiation curable elastomeric material may be irradiated at ambient or room temperature within the confines of a molding operation or at a temperature associated with the component formed in a molding or extrusion process. When desirable the molded part may be subjected to a cooling step prior to irradiation with UV light. Although, no thermal cure is necessary, a dual cure system may be used when desirable.

The adhesive material may include, but not be limited to epoxy adhesives, urethane adhesives, acrylic adhesives, cyanoacrylate adhesives, silicone adhesives, modified silane polymers, hot melt adhesives, contact glue (e.g., solvent-borne adhesive comprising natural or synthetic rubber resins with or without halogenation, such as polychloroprene, etc.) or combinations thereof. Alternatively, the adhesive is a thermoplastic polyurethane (TPU), a cyanoacrylate, an acrylic, a contact adhesive, a silicone a modified silane polymer, or a mixture thereof. Alternatively, the adhesive material may be a thermoplastic adhesive material; alternatively, the adhesive material is a hot melt adhesive. These hot melt adhesives may be selected as one or more ethylene-vinyl acetate polymers, polyolefins, polyamides, polyesters, polyurethanes, styrene block copolymers, polycaprolactone, polycarbonates, fluoropolymers, silicones, and mixtures or copolymers thereof. One specific example of an adhesive material includes, but is not limited to thermoplastic polyurethanes.

Optionally, the adhesive material may comprise one or more processing additives. These process additives may be independently selected and include without limitation tackifying resins, waxes, plasticizers, antioxidants, UV stabilizers, pigments, dyes, biocides, flame retardants, antistatic agents, and filler materials.

The hot melt adhesive can be any polymer or mixture with the restriction or proviso that the temperature at which the adhesive melts does not inversely affect the performance of the UV radiation curable elastomer. In this respect, the temperature of the UV radiation curable elastomeric material does not exceed 120° C. during the method of forming the multilayer composite. Although not wanting to be held to theory, it is believed that a higher temperature will result in lower performance of the UV radiation curable elastomeric material, as well as the possible extraction of dyes from the yarns used in a textile substrate.

Figure 4:
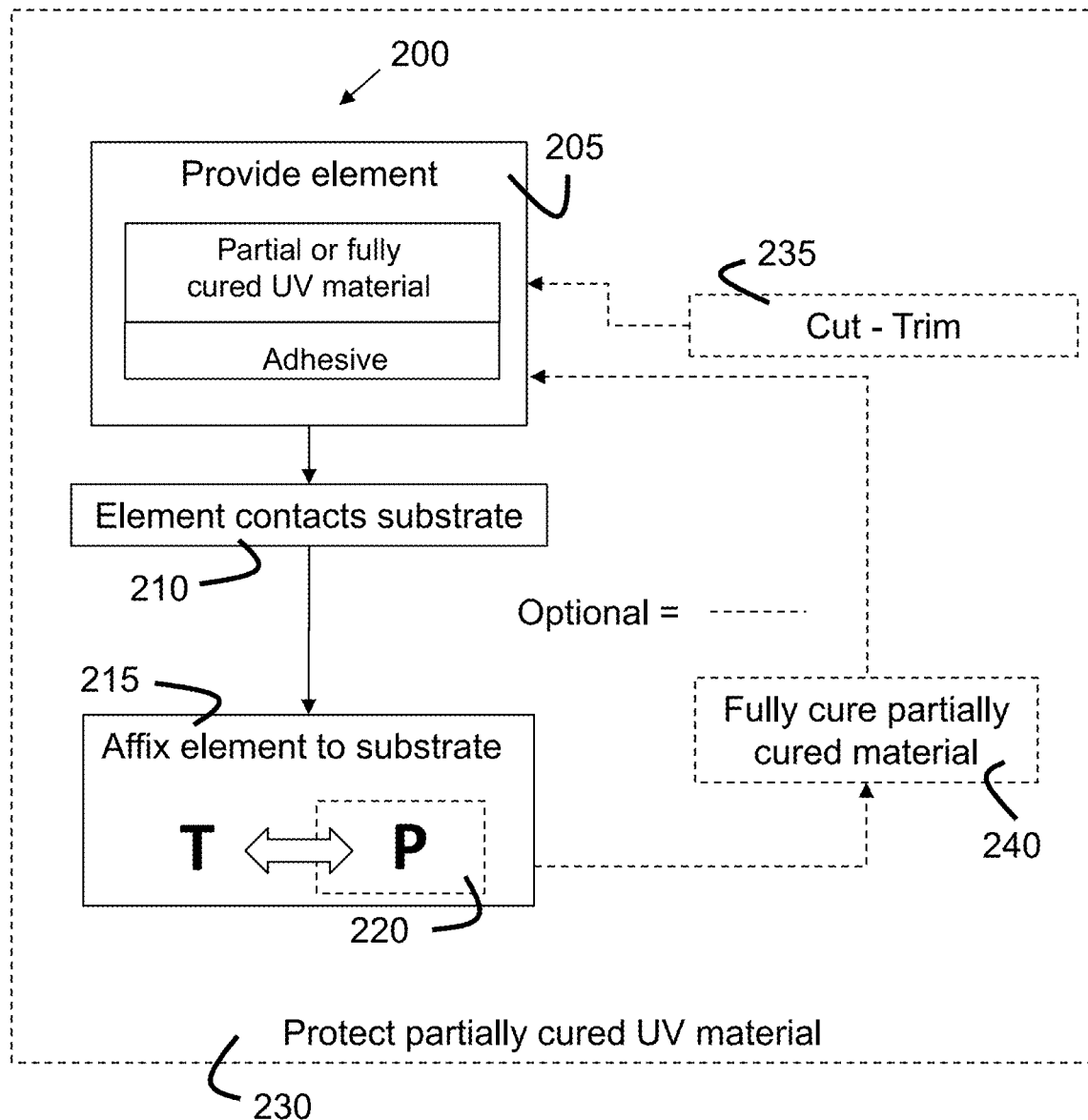
FIG. 4 is a flow chart of another method of manufacturing an article according to the teachings of the present disclosure.

Referring now to FIG. 4, another method 200 of manufacturing an article may involve providing 205 an element formed of a composite. This composite generally has the composition as shown in FIG. 2B. The composite may include a first region formed of a partially cured UV radiation curable elastomeric material or a fully cured UV radiation curable elastomeric material affixed to a second region formed of an adhesive material, such that the adhesive material defines at least a portion of a surface of the element. The surface of the element, which is defined by the layer of adhesive material, is placed 210 in contact with a surface of a substrate. The element is affixed 215 to the substrate by increasing a temperature of at least a portion of the surface of the element above a melting point of the adhesive material, while at least a portion of the element is in contact with the surface of the substrate, thereby, forming a bond between the surface of the element and the surface of the substrate When desirable, the step affixing 215 the multilayer composite to the substrate may further comprise applying 220 pressure to at least a portion of the adhesive material of the multilayer composite while the at least a portion of the adhesive material is in direct contact with the surface of the substrate. The use of a vacuum, either a partial vacuum or a full, i.e., perfect, vacuum may be used pull the UV radiation curable material into closer or more intimate contact with the surface of the textile.

The pressure that may be applied to the composite and substrate in order to attach them together may range from about 2 kgf/cm$^2$ (~28 psi) to about 200 kgf/cm$^2$ (2,800 psi). Alternatively, the amount of pressure applied ranges from about 3 kfg/cm$^2$ (~40 psi) to about 6 kfg/cm$^2$ (~80 psi); alternatively, between about 6 kfg/cm$^2$ (~80 psi) to about 35 kfg/cm$^2$ (~500 psi); and alternatively, between about 35 kfg/cm$^2$ (~500 psi) to about 150 kfg/cm$^2$ (~2,100 psi)

For the purpose of this disclosure the terms "about" and "substantially" are used herein with respect to measurable values and ranges due to expected variations known to those skilled in the art (e.g., limitations and variability in measurements).

For the purpose of this disclosure any range in parameters that is stated herein as being "between [a 1$^{st}$ number] and [a 2$^{nd}$ number]" or "between [a 1$^{st}$ number] to [a 2$^{nd}$ number]" is intended to be inclusive of the recited numbers. In other words the ranges are meant to be interpreted similarly as to a range that is specified as being "from [a 1$^{st}$ number] to [a 2$^{nd}$ number]".

Still referring to FIG. 4, the composite may be cut or trimmed 235 as needed or required. The composite may be subjected to cutting or trimming 235 in order to shape the composite, such that it resembles a desired pattern. In addition, any excess material or unnecessary material may further be cut or trimmed after the shaped composite is placed in contact with the surface of the substrate. Additional composite material may also be trimmed or cut from the article as part of a finishing operation. The cutting or trimming of the article may be performed prior to or after exposure to the UV radiation. Other finishing operations, which include but are not limited to, polishing embossing, steaming/ironing, brushing, or decorative stitching, to name a few can also be performed on the article without exceeding the scope of the present disclosure.

Referring again to FIG. 4, the method 200 may further comprise exposing at least a portion of the partially cured UV radiation curable elastomeric material to ultraviolet (UV) radiation in an amount and for a duration sufficient to further cure the portion of the partially cured UV radiation curable elastomeric material; alternatively, fully cure the partially cured portion of the UV radiation curable material. During the entire method 200, at least a portion of the partially cured UV radiation curable elastomeric material may be protected 230 from exposure to ultraviolet (UV) radiation during one or more steps of the method 200. The various types of precautions or safeguards that may be undertaken by one skilled in the art in order to protect at least a portion of the partially cured UV radiation curable material from being exposed to UV radiation during one or more steps of the method may include, but not be limited to, masking a portion of the UV radiation curable elastomeric material or the surface upon which the material is in contact, as well as maintaining the UV radiation curable material in an environment that is absent any UV/visible light.

The article formed according to this method 200 generally comprises an element formed of a composite and a substrate. The composite includes a first region formed of fully cured or partially cured UV radiation curable elastomeric material affixed to a second region formed of an adhesive material, the second region formed of the adhesive material defines at least a portion of a surface of the element. The substrate includes a surface; wherein at least a portion of the surface of the element and the surface of the substrate are affixed to each other by the adhesive material.

Figure 5:
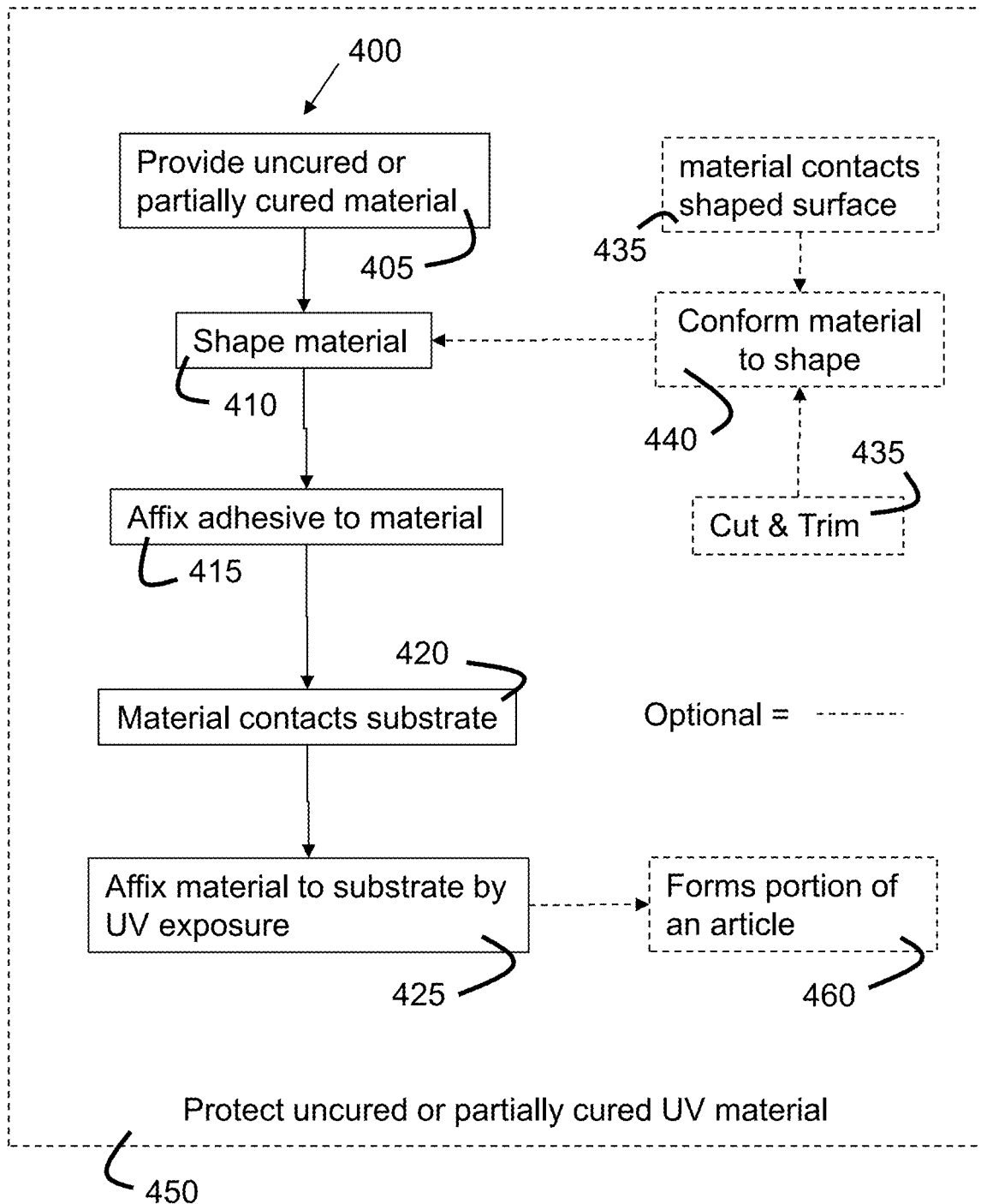
FIG. 5 is a flow chart of a method of forming a cured composite according to the teachings of the present disclosure.

According to another aspect of the present disclosure, a method of forming a cured composite is provided. Referring now to FIG. 5, this method 400 generally comprises providing 405 an uncured or partially cured ultraviolet (UV) radiation curable elastomeric material. The uncured or partially cured ultraviolet (UV) radiation curable elastomeric material is shaped 410 to have a surface. The one or more regions of an adhesive material is affixed 415 to the surface of the uncured or partially cured UV radiation curable elastomeric material, thereby, forming an uncured composite. The surface of the element, which is defined by the UV radiation curable material, is placed 420 in contact with a surface of a substrate. The substrate may comprise 412, but not be limited to, one or more of leather, a thermoset polymer, a thermoplastic polymer, or a mixture thereof. The substrate may also be comprised of one or more textiles including at least one natural or synthetic fiber or yarn comprising without limitation one or more thermoplastic polyurethanes (TPUs), polyamides, polyesters, polyolefins, or a mixture thereof. The element is affixed 425 to the surface of the substrate by exposing at least a portion of the uncured composite to UV radiation in a sufficient amount for a sufficient duration of time to at least partially cure the uncured UV radiation curable elastomeric material or to fully cure the partially cured UV radiation curable elastomeric material, thereby, forming the cured composite The method 400 may further include the shaping of the UV radiation curable material into a customized embellishment having a predetermined shape by placing 435 the UV radiation curable elastomeric material in contact with a surface that corresponds to the shape; and using 440 heat, pressure, or both to conform the UV radiation curable material to the shape. The surface that corresponds to the shape may be part of a compression mold. When desirable, the method 400 may further comprise cutting or trimming 445 the customized embellishment or element. During the performance of the method 400, the temperature of the UV radiation curable material does not exceed 120° C. during the process steps associated with forming the customized embellishment.

The step of affixing 425 the customized embellishment or element to a substrate comprises exposing at least a portion of the UV radiation curable material to ultraviolet (UV) radiation in an amount and for a duration sufficient to partially cure the portion of the UV radiation curable material. Alternatively, the UV radiation curable material is exposed to UV radiation in an amount and for a duration of time sufficient to fully cure the material. During one or more steps in the method 400, at least a portion of the UV radiation curable material may be protected 450 from (UV) radiation.

The cured composite formed according to this method 400 generally comprises a fully cured or partially cured UV radiation curable elastomeric material that has a shape and a surface. One or more regions of an adhesive material are affixed to the surface by bonds formed by exposure to UV radiation of a precursor material (e.g., uncured or partially cured UV radiation curable elastomeric material) to the partially cured or fully cured UV radiation curable elastomeric material.

Figure 6A:
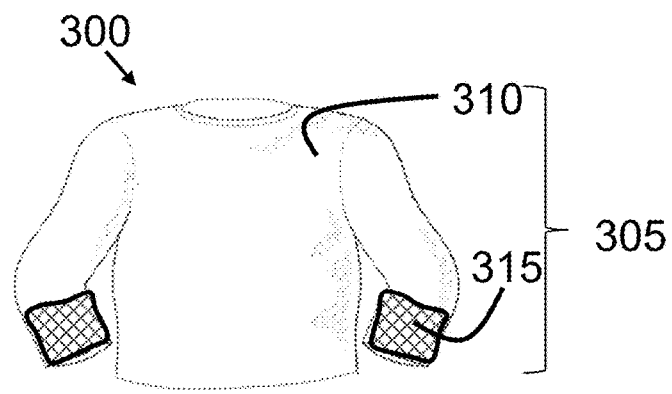
FIG. 6A is a perspective view of a finished article in the form of a apparel (e.g., a garment) manufactured according to the methods of the present disclosure.
Figure 6B:
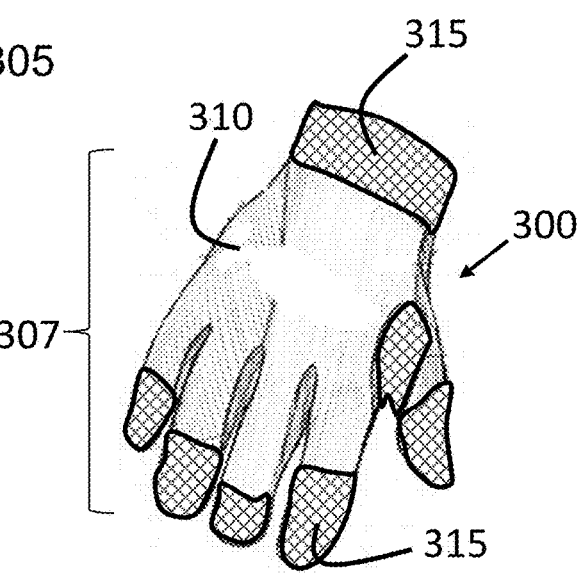
FIG. 6B is a perspective view of another finished article in the form of sporting equipment (e.g., a glove) manufactured according to the methods of the present disclosure.
Figure 6C:
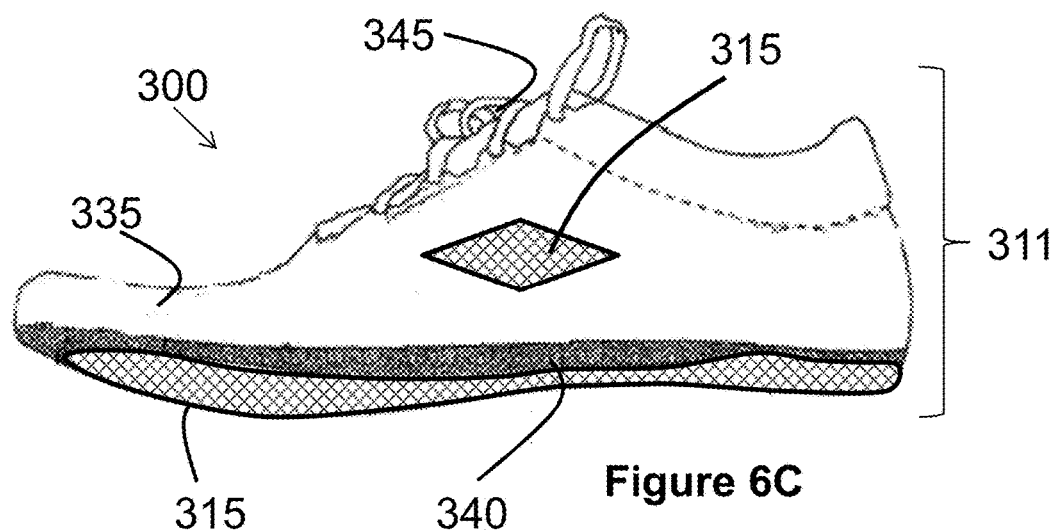
FIG. 6C is a perspective view of another finished article in the form of footwear manufactured according to the methods of the present disclosure.

According to another aspect of the present disclosure, the substrate to which the composite or customized embellishment is affixed may form 450 (see FIG. 5) a portion of a finished article, or a component of an article. Referring now to FIGS. 6A, 6B, and 6C, the finished article 300 may be, without limitation, an article of apparel, such as a garment 305, or an article of sporting equipment, such as a ball cap, a helmet, footwear 311; a tire or wheel; hunting, hiking, or camping equipment; a ball, glove, bat, club, or protective gear 307. Alternatively, the customized embellishment 315 may be attached to, coupled with, or in contact with another material, e.g., the substrate 310 of the finished article 300. The component 315 of the article of footwear 311 may be an outsole 315, for example (see FIG. 6C). As used herein, the terms "article of footwear" and "footwear" are intended to be used interchangeably to refer to the same article. Typically, the term "article of footwear" will be used in a first instance, and the term "footwear" may be subsequently used to refer to the same article for ease of readability. When the finished article 300 is footwear 311, the customized embellishment 315 may be part of the upper 335 or part of the outsole 315; alternatively, part of the outsole 315.

The substrate used herein may comprise, without limitation, leather, a thermoset polymer, a thermoplastic polymer, a foam, or a mixture thereof. The substrate may also be comprised of one or more textiles including, without limitation, a knit textile, a woven textile, a non-woven textile, a braided textile, or any combination thereof. The one or more textiles may include one or more natural or synthetic fibers or yarns. The synthetic yarns may comprise, consist of, or consist essentially of one or more thermoplastic polyurethanes (TPUs), polyamides, polyesters, polyolefins, or a mixture thereof.

Figure 7:
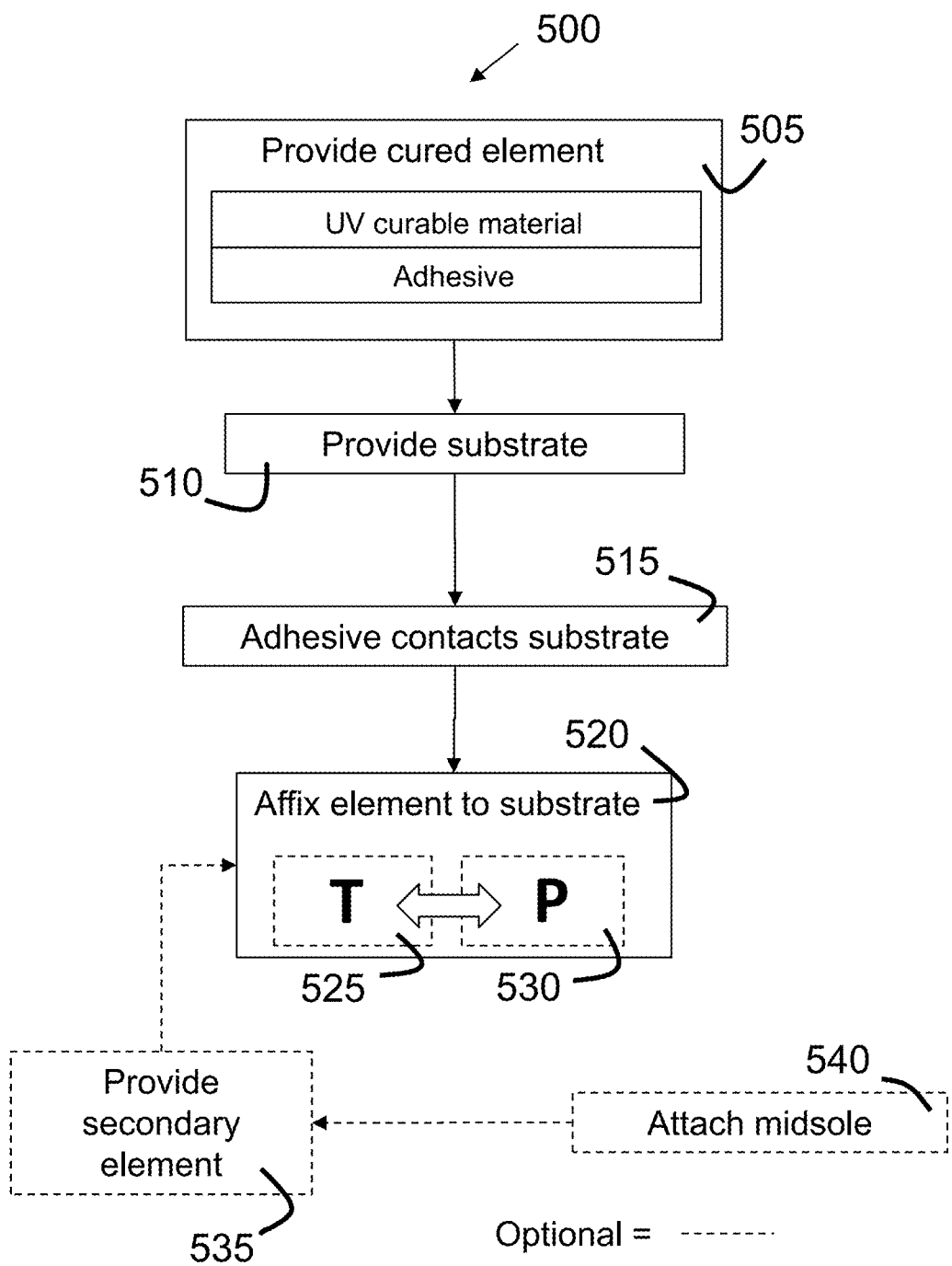
FIG. 7 is a flow chart of yet another method of forming an article according to the teachings of the present disclosure.

According to yet another aspect of the present disclosure, another method 500 as shown in FIG. 7 for forming an article includes providing 505 an element comprising the cured composite formed according to method 400 or previously defined above. This cured composite comprises one or more regions of an ultraviolet (UV) radiation curable material (i.e., an elastomeric UV radiation curable material) and one or more regions of an adhesive material that at least partially defines a surface of the element. A substrate 510 is provided that also has a surface. At least one region of the adhesive material of the element is placed 515 in contact with the surface of the substrate. The at least one region of the surface of the element is affixed 520 to the surface of the substrate by increasing 525 the temperature of the at least one region of the element or applying 530 pressure to the at least one region of the element or both while the at least one region of the element and the surface of the substrate are in contact with one another. A bond is formed between the at least one region of the element and the substrate, thereby, forming the article. When desirable, a secondary element may be provided and affixed 535 to the UV radiation curable material of the element.

According to one aspect of the present disclosure, the structured element may be an outsole, a component of the outsole, an upper, or a component of the upper; such that when the structured element is the outsole or the component of the outsole, then the substrate is the upper or the component of the upper; and when the structured element is the upper or the component of the upper, then the substrate is the outsole or the component of the outsole. In this case, the optional secondary component may a midsole or a midsole component 540 that can be attached to the upper or component of the upper before or concurrently with attaching the upper or component of the upper to the outsole or component of the outsole. The attachment of the upper to the outsole or the upper and the midsole to the outsole may comprise exposing at least a portion of the outsole to heat, pressure, or both, such that the adhesive material that is in direct contact with the upper adheres to the upper.

Still referring to FIG. 7, the UV radiation curable material may be a component of the outsole and the outsole may further comprise a second elastomer, such that the UV radiation curable material is protected from exposure to UV radiation upon curing of the second elastomer. In this respect, the method 500 may further comprising providing 535 a secondary element that includes the UV radiation curable material, placing the secondary element in contact with the protected portion of the UV radiation curable material of the structured element, and exposing the secondary element and structured element to UV radiation to cure the UV radiation curable material, and affix the secondary element to the structured element.

The substrate (e.g., an upper, etc.) may comprise one or more of a textile, leather, or both. Alternatively, the substrate may be made from or include one or more components made from one or more of natural or synthetic leather, a thermoset polymer, a thermoplastic polymer, or combination thereof. At least a portion of the upper or substrate may comprise one or more textiles. The textiles may include; a knit, braided, woven, or nonwoven textile made in whole or in part of a natural fiber; a knit, braided, woven or non-woven textile made in whole or in part of a synthetic polymer, a film of a synthetic polymer, etc.; and combinations thereof. The one or more textiles may include one or more natural or synthetic fibers or yarns. The synthetic yarns may comprise, consist of, or consist essentially of thermoplastic polyurethane (TPU), polyimide (e.g., Nylon®, etc.), polyester (e.g., polyethylene terephthalate or PET), polyolefin, or a mixture thereof.

The substrate or upper and components of the substrate or upper may be manufactured according to conventional techniques (e.g., molding, extrusion, thermoforming, stitching, knitting, etc.). The substrate or upper may alternatively have any desired aesthetic design, functional design, brand designators, or the like. In the case of footwear, the upper may further comprise laces, flaps, straps, or other securing or foot engagement structures used to securely hold the shoe 75 to a wearer's foot. A tongue member, bootie, or other similar type structure may be provided in or near the shoe instep area in order to increase comfort and/or to moderate the pressure or feel applied to the wearer's foot by any foot engagement structures.

When desirable, at least a portion of the upper of the article of footwear, and in some embodiments substantially the entirety of the upper, may be formed of a knitted component. Thus, the textile may be a knit textile with a circular knit textile being one specific example thereof. The knitted component may additionally or alternatively form another element of the article of footwear, such as the insole, for example.

The knitted component may have a first side forming an inner surface of the upper (e.g., facing the void of the article of footwear) and a second side forming an outer surface of the upper. An upper including the knitted component may substantially surround the void in order to substantially encompass the foot of a person when the article of footwear is in use. The first side and the second side of the knitted component may exhibit different characteristics (e.g., the first side may provide abrasion resistance and comfort while the second side may be relatively rigid and provide water resistance). The knitted component may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the knitted component without the need for significant post-knitting processes or steps. Alternatively, two or more portions of the knitted component may be formed separately and then attached. In some embodiments, the knitted component may be shaped after the knitting process to form and retain the desired shape of the upper (for example, by using a foot-shaped last). The shaping process may include attaching the knitted component to another object (e.g., a strobel) and/or attaching one portion of the knitted component to another portion of the knitted component at a seam by sewing, by using an adhesive, or by another suitable attachment process.

Forming the upper with the knitted component may provide the upper with advantageous characteristics including, but not limited to, a particular degree of elasticity (for example, as expressed in terms of Young's modulus), breathability, bendability, strength, moisture absorption, weight, and abrasion resistance. These characteristics may be accomplished by selecting a particular single layer or multilayer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof.

The knitted component may also provide desirable aesthetic characteristics by incorporating yarns having different colors or other visual properties arranged in a particular pattern. The yarns and/or the knit structure of the knitted component may be varied at different locations such that the knitted component has two or more portions with different properties (e.g., a portion forming the throat area of the upper may be relatively elastic while another portion may be relatively inelastic). In some embodiments, the knitted component may incorporate one or more materials with properties that change in response to a stimulus (e.g., temperature, moisture, electrical current, magnetic field, or light). For example, the knitted component may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. The thermoplastic polymer material may provide the ability to heat and then cool a portion of the knitted component to thereby form an area of bonded or continuous material that exhibits certain advantageous properties including a relatively high degree of rigidity, strength, and water resistance, for example.

In some embodiments, the knitted component may include one or more yarns or strands that are at least partially inlaid or otherwise inserted within the knit structure of the knitted component during or after the knitting process, herein referred to as "tensile strands." The tensile strands may be substantially inelastic so as to have a substantially fixed length. The tensile strands may extend through a plurality of courses of the knitted component or through a passage within the knitted component and may limit the stretch of the knitted component in at least one direction. For example, the tensile strands may extend approximately from a bite line of the upper to a throat area of the upper to limit the stretch of the upper in the lateral direction. The tensile strands may form one or more lace apertures for receiving a lace and/or may extend around at least a portion of a lace aperture formed in the knit structure of the knitted component.

When present in an article of footwear a midsole generally comprises a foam material formed as sheet stock, by injection molding, by compression molding, or a combination thereof. This foam material may include, without limitation, a polyurethane (PU), an ethylene vinyl acetate (EVA), or a mixture of PU or EVA with a natural or synthetic rubber.

The outsole refers to the very bottom of the shoe that is in direct contact with the ground. The outsole may be relatively smooth or include one or more traction elements. These traction elements may provide enhanced traction, as well as provide support or flexibility to the outsole and/or provide an aesthetic design or look to the shoe. The traction elements may include, but are not limited to a tread pattern, as well cleats, studs, spikes, or similar elements configured to enhance traction for a wearer during cutting, turning, stopping, accelerating, and backward movement.

Since the outsole is the outer most sole of the shoe, it is directly exposed to abrasion and wear. Various portions of the outsole may be constructed with different thickness and exhibit different degrees of flexibility. The materials that comprise the outsole should provide some degree of waterproofing, durability, and possess a coefficient of friction that is high enough to prevent slipping. In some cases two or more materials of different densities can be incorporated into the outsole to give a hard wearing outer surface and a softer, more flexible midsole for greater comfort. The outsole may be a single layer or may contain multiple layers of the same or similar material, provided at least a portion of the outsole comprises an UV radiation curable material. Alternatively, substantially all of the outsole comprises an UV radiation curable material.

The outsole may be directly or otherwise operably secured to the upper using any suitable mechanism or method. As used herein, the terms "operably secured to", such as for an outsole that is operably secured to an upper, refers collectively to direct connections, indirect connections, integral formations, and combinations thereof. For instance, for an outsole that is operably secured to an upper, the outsole can be directly connected to the upper (e.g., adhered directly thereto or glued with a cement or an adhesive), can be integrally formed with the upper (e.g., as a unitary component), and combinations thereof.

Figure 8:
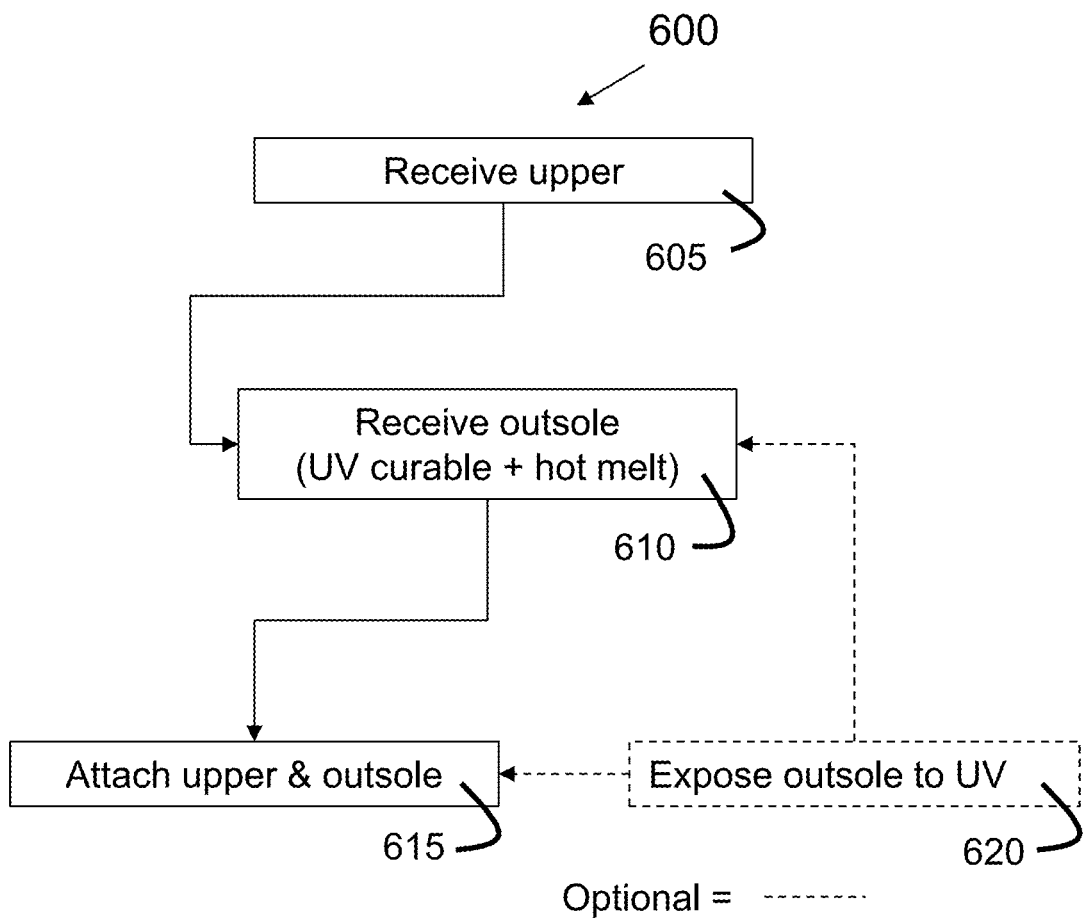
FIG. 8 is a flow chart of a method of forming an article of footwear according to the teachings of the present disclosure.

Referring now to FIG. 8, a method of forming an article of footwear is provided that comprises, consists of, or consists essentially of the various steps and components used within the process or method previously described above, as well as any additional information subsequently provided below. This method 600 generally comprises receiving an upper 610. The upper may be formed of a textile that has a predetermined contour. An outsole is received 610 that comprises an ultraviolet (UV) radiation curable material (i.e., an elastomeric UV radiation curable material) and a hot melt adhesive in the form of a multilayered composite. The upper and the outsole are then attached 615. The adherence of the upper and outsole may be facilitated or enhance by exposing 620 the outsole to UV radiation in order to at least partially cure the material; alternatively, fully cure the UV radiation curable material.

Bond Strength Testing Protocol

A bonding test is performed with the purpose of evaluating the strength of the adhesion bond along an interface of the UV radiation cured material and another material. For example, the adhesion bond can be a bond between an outsole and an upper of an article of footwear. In this test a flat component (e.g., a textile) is placed in contact with an UV radiation curable material on a flat surface, and then a compressive force of at least 2 kgf/cm$^2$ is applied to the combination of the component and the UV radiation curable material, leaving an edge region of the component and an opposing edge region of the UV radiation curable material which are not in contact or compressed. Following the compression, the combination of the component and the UV radiation curable material is then exposed UV radiation in an amount and for a duration that is sufficient to fully cure the UV radiation curable material, forming a composite sheet including the edge regions. The composite sheet is then cut into strips to form test specimens, with each test specimen including a length of the edge regions for grasping in a test apparatus capable of measuring applied force, such as an Instron testing system. Each strip has a width of 25.4 cm (1 inch). Intervals are marked along the length of the strips with each interval being spaced apart by 2 cm. Depending upon the length of the strips, between 2 and 5 intervals may be marked on each strip. The edge of textile and the UV radiation curable material of a molded specimen are then grasped at an edge region by the testing apparatus. The tabs are then pulled with an increasing amount of force until the surfaces of the textile and the UV radiation curable material are separated over the length of at least one interval. The amount of force required to separate the surfaces of the textile and the UV radiation curable material is measured by the testing apparatus. In order for a specimen to be considered as passing the bonding test, a minimum force of 2.5 kgf/cm force is required to separate the bonded surfaces of the component and the UV radiation cured material.

Example 1—Bonding Performance

UV radiation curable polyurethane rubber (Millathane® UV, TSE Industries Inc., Clearwater, Fla.) was attached using a compression molding process to a knit textile formed of TPU coated yarn (Runs A & B) manufactured by Sambu Fine Chemicals, Korea and to a knit textile formed of uncoated PET yarn (Runs C & D) manufactured by Unifi, Inc. (Greensboro, N.C., USA). The combinations of the UV radiation curable polyurethane rubber and knit textiles were then exposed to UV light, fully curing the UV radiation curable polyurethane rubber. Each of the four cured samples was prepared and tested twice (Tests 1 & 2) according to the Bond Strength Testing Protocol described above. The measured test results are summarized in Table 1.

UV Radiation Curable Table 1—Bonding Test Results

| Run No. | Description | Test 1 (kgf/cm) | Test 2 (kgf/cm) | Pass/Fail (≥2.5 kgf/cm) |
|---|---|---|---|---|
| A | UV radiation curable cured polyurethane rubber w/ TPU coated yarn | 3.4 | 3.4 | PASS |
| B | UV radiation curable cured polyurethane rubber w/ TPU coated yarn | 3.4 | 3.8 | PASS |
| C | UV radiation curable cured polyurethane rubber w/ uncoated PET yarn | Tab broke at 2.9 | Tab broke at 2.9 | PASS |
| D | UV radiation curable cured polyurethane rubber w/ uncoated PET yarn | 3.1 | 3.5 | PASS |

This example demonstrates that the UV radiation curable polyurethane rubber can be attached to a textile with the bond strength necessary to be used as an outsole in an article of footwear. More specifically, Runs A-D maintained their bond after application of a 2.5 kgf/cm force in the Bond Strength Test, and more than a 2.9 kgf/cm force was necessary to break the bonds.

The previous examples are given to illustrate the attachment between the element or composite and a substrate, such as that found in the article of footwear, formed according to the teachings of the present disclosure, as well as the bond strength formed there between, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject matter of the disclosure may also relate, among others, to the following aspects:

1 A method of manufacturing an article, comprising:
 providing an element formed of an elastomeric material, the elastomeric material including an uncured ultraviolet (UV) radiation curable elastomeric material, or a partially cured UV radiation curable elastomeric material, or a fully cured UV radiation curable elastomeric material, the element having a surface;
 placing the surface of the element in contact with a surface of a substrate;
 increasing a temperature of at least a portion of the surface of the element, applying pressure to the at least a portion of the surface of the element, or both; and
 affixing the surface of the element to the surface of the substrate by forming a bond between the surface of the element and the surface of the substrate, thereby forming the article.

2. The method of aspect 1, wherein the element includes the uncured UV radiation curable elastomeric material, or the partially cured UV radiation curable elastomeric material defining at least a portion of the surface,
 the placing the surface of the element in contact with the surface of the substrate is performed prior to applying pressure to the at least a portion of the surface of the element while the surface of the element is in contact with the surface of the substrate, and
 the affixing the surface of the element to the surface of the substrate is performed concurrently with or following the applying the pressure, the affixing includes exposing the at least a portion of the surface of the element to UV radiation in an sufficient amount for a sufficient duration of time to at least partially cure the uncured UV radiation curable elastomeric material or to fully cure the partially cured UV radiation curable elastomeric material of the element, thereby forming chemical bonds between the partially cured or fully cured UV radiation curable elastomeric material of the element and material of the substrate.

3. The method of aspect 1, wherein the element includes the partially cured UV radiation curable elastomeric material or the fully cured UV radiation curable elastomeric material and further includes an adhesive material defining at least a portion of the surface of the element;
 the increasing the temperature of the at least a portion of the surface of the element is performed concurrently with or prior to placing the surface of the element in contact with the surface of the substrate; and
 the forming the bond between the surface of the element and the surface of the substrate comprises applying pressure to the at least a portion of the surface of the element when a temperature of the at least a portion of the surface of the element is above a melting point of the adhesive material while the at least a portion of the element is in contact with the surface of the substrate, and subsequently decreasing the temperature of the at least a portion of the surface of the element to a temperature below the melting point of the adhesive material while the at least a portion of the surface of the element remains in contact with the surface of the substrate, thereby forming a physical bond between the adhesive material of the element and material of the substrate.

4. The method of any of Aspects 1-3, wherein the uncured UV radiation curable elastomeric material, the partially cured UV radiation curable elastomeric material, or the fully cured UV radiation curable material includes an UV radiation curable rubber.

5. The method of Aspect 4, wherein the UV radiation curable rubber includes an UV radiation curable polyurethane rubber.

6. The method of any of Aspects 1-5, wherein the uncured or partially cured UV radiation curable elastomeric material further comprises one or more photoinitiators.

7. The method of Aspect 6, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

8. The method of any of Aspects 1-7, wherein the uncured ultraviolet (UV) radiation curable elastomeric material, the partially cured UV radiation curable elastomeric material, or the fully cured UV radiation cured elastomeric material further comprises one or more processing aids.

9. The method of Aspect 8, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

10. The method of Aspect 3, wherein the adhesive material is a hot melt adhesive.

11. The method of Aspect 10, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

12. The method of any of Aspects 10-11, wherein the hot melt adhesive further comprises on or more additives.

13. The method of Aspect 12, wherein the additives are independently selected from the group consisting of tackifying resins, waxes, plasticizers, antioxidants, UV stabilizers, pigments, dyes, biocides, flame retardants, antistatic agents, and filler materials.

14. The method of any of Aspects 1 to 13, wherein the element is an element having a shape, the shape formed by molding, cutting or trimming the elastomeric material.

15. The method of any of Aspects 1-14, wherein the substrate is formed from one or more materials, the one or more materials including leather, thermoset polymers, thermoplastic polymers, and combinations thereof.

16. The method of Aspect 15, wherein the thermoplastic polymers include thermoplastic polyurethanes (TPUs), polyamides, polyesters, polyolefins, and mixtures thereof.

17. The method of any of Aspects 1-16, wherein the surface of the element is placed in contact with a portion of the substrate including a textile.

18. The method of Aspect 17, wherein the textile includes fibers formed from a polymeric material comprising one or more thermoplastic polyurethanes (TPUs).

19. The method of any of Aspects 1-18, wherein the substrate is formed from one or more textiles, the one or more textiles including knit textiles, woven textiles, non-woven textiles, braided textiles, and combinations thereof.

20. The method of Aspect 19, wherein the one or more textile is formed from one or more natural or synthetic fibers or natural or synthetic yarns.

21. The method of Aspect 20, wherein the synthetic fibers or yarns are formed from a polymeric material comprising thermoplastic polyurethanes (TPUs), polyamides, polyesters, polyolefins, or a mixture thereof.

22. The method of any of Aspects 1-21, wherein the article is an article of apparel, a component of an article of apparel, an article of sporting equipment, or a component of an article of sporting equipment.

23. The method of Aspect 22, wherein the article is a garment, a component of a garment, an article of footwear or a component of an article of footwear.

24. The method of Aspect 23, wherein the article is an article of footwear comprising an outsole and an upper, wherein the element is the outsole or a component of the outsole.

25. An article comprising:
    an element formed of an elastomeric material, the elastomeric material including an uncured ultraviolet (UV) radiation curable elastomeric material, a partially cured UV radiation curable elastomeric material, or a fully cured UV radiation curable elastomeric material, the element having a surface; and
    a substrate having a surface; wherein the surface of the element and the surface of the substrate are affixed to each other.

26. The article of Aspect 24, wherein one or more chemical bonds are formed between the surface of the element and the surface of the substrate.

27. The article of any of Aspects 24-25, wherein the article further includes an adhesive material that defines at least a portion of the surface of the element.

28. The article of Aspect 26, wherein at least one physical bond exists between the adhesive material and the surface of the substrate 29. The article of any of Aspects 24-27, wherein the uncured UV radiation curable elastomeric material, the partially cured UV radiation curable elastomeric material, or the fully cured UV radiation curable material includes an UV radiation curable polyurethane rubber.

30. The article of Aspect 28, wherein the UV radiation curable rubber includes an UV radiation curable polyurethane rubber.

31. The article of any of Aspects 24-29, wherein the uncured or partially cured UV radiation curable elastomeric material further comprises one or more photoinitiators.

32. The article of Aspect 30, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

33. The article of any of Aspects 24-31, wherein the uncured ultraviolet (UV) radiation curable elastomeric material, the partially cured UV radiation curable elastomeric material, or the fully cured UV radiation cured elastomeric material further comprises one or more processing aids.

34. The article of Aspect 32, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

35. The article of Aspect 26, wherein the adhesive material is a hot melt adhesive.

36. The article of Aspect 34, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

37. The article of any of Aspects 34-35, wherein the hot melt adhesive further comprises on or more additives.
38. The article of Aspect 36, wherein the additives are independently selected from the group consisting of tackifying resins, waxes, plasticizers, antioxidants, UV stabilizers, pigments, dyes, biocides, flame retardants, antistatic agents, and filler materials.
39. The article of any of Aspects 24 to 37, wherein the element has a shape, the shape formed by molding, cutting or trimming the elastomeric material.
40. The article of any of Aspects 24-38, wherein the substrate comprises one or more materials, the one or more materials including leather, thermoset polymers, thermoplastic polymers, and combinations thereof.
41. The article of Aspect 39, wherein the thermoplastic polymers include thermoplastic polyurethanes (TPUs), polyamides, polyesters, polyolefins, and mixtures thereof.
42. The article of any of Aspects 24-40, wherein the substrate comprises one or more textiles.
43. The article of Aspect 42, wherein the one or more textiles includes knit textiles, woven textiles, non-woven textiles, braided textiles, and combinations thereof.
44. The article of Aspect 43, wherein the one or more textiles is formed from one or more natural or synthetic fibers or natural or synthetic yarns.
45. The article of Aspect 44, wherein the one or more textiles includes fibers or yarns formed from a polymeric material comprising thermoplastic polyurethanes (TPUs), polyamides, polyesters, polyolefins, or a mixture thereof.
46. The article of any of Aspects 25-45, wherein the article is an article of apparel, a component of an article of apparel, an article of sporting equipment, or a component of an article of sporting equipment.
47. The article of any of Aspects 25-45, wherein the article is a garment, a component of a garment, an article of footwear or a component of an article of footwear.
48. The article of Aspect 47, wherein the article is an article of footwear comprising an outsole and an upper, wherein the element is the outsole or a component of the outsole.
49. The article of any of Aspects 25-48, wherein the article is formed according to the method of any of Aspects 1-24.
50. A method of manufacturing an article, the method comprising:
    providing an element, the element having a shape including a surface, wherein at least a portion of the surface of the element is defined by an uncured or partially cured ultraviolet (UV) radiation curable elastomeric material;
    placing the at least a portion of the surface of the element in contact with a surface of a substrate; and
    affixing the at least a portion of the surface of the element to the surface of the substrate by applying pressure and UV radiation to the at least a portion of the element, forming a bond between the surface of the element and the surface of the substrate, thereby forming the article.
51. The method of Aspect 50, wherein the applying UV radiation to the portion of the surface of the element includes applying a sufficient amount of UV radiation for a sufficient duration of time to at least partially cure the uncured UV radiation curable elastomeric material or to fully cure the partially cured UV radiation curable elastomeric material of the portion of the surface of the element.
52. The method of any of Aspects 50-51, wherein shaping the element comprises molding, cutting or trimming the element.
53. The method of any of Aspects 50-52, wherein the element is a multilayered sheet or film and the shaping of the element comprises:
    placing the element in contact with a surface that corresponds to the shape; and
    using heat, pressure, or both to conform the element to the shape.
54. The method of Aspect 53, wherein the surface that corresponds to the shape is part of a compression mold.
55. The method of any of Aspects 53-54, wherein the multilayered sheet or film is formed in a co-extrusion process or a lamination process.
56. The method of any of Aspects 50-55, wherein the method further comprises protecting at least a portion of the uncured or partially cured UV radiation curable elastomeric material from ultraviolet radiation during one or more steps of the method.
57. The method of any of Aspects 50-56, wherein the uncured UV radiation curable elastomeric material, the partially cured UV radiation curable elastomeric material, or the fully cured UV radiation curable material includes an UV radiation curable rubber.
58. The method of Aspect 57, wherein the UV radiation curable rubber includes an UV radiation curable polyurethane rubber.
59. The method of any of Aspects 50-58, wherein the uncured or partially cured UV radiation curable elastomeric material further comprises one or more photoinitiators.
60. The method of Aspect 59, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.
61. The method of any of Aspects 50-60, wherein the uncured ultraviolet (UV) radiation curable elastomeric material, the partially cured UV radiation curable elastomeric material, or the fully cured UV radiation cured elastomeric material further comprises one or more processing aids.
62. The method of Aspect 61, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.
63. The method of any of Aspects 50-62, wherein the substrate is formed from one or more materials, the one or more materials including leather, thermoset polymers, thermoplastic polymers, and combinations thereof.
64. The method of Aspect 63 wherein the thermoplastic polymers include thermoplastic polyurethanes (TPUs), polyamides, polyesters, polyolefins, and mixtures thereof.
65. The method of any of Aspects 50-64, wherein the surface of the element is placed in contact with a portion of the substrate including a textile formed from a polymeric material comprising one or more thermoplastic polyurethanes (TPUs).
66. The method of any of Aspects 50-65, wherein the substrate is formed from one or more textiles, the one or more textiles including knit textiles, woven textiles, non-woven textiles, braided textiles, and combinations thereof.
67. The method of Aspect 66, wherein the one or more textile is formed from one or more natural or synthetic fibers or natural or synthetic yarns.
68. The method of Aspect 67, wherein the synthetic fibers or yarns are formed from a polymeric material comprising thermoplastic polyurethanes (TPUs), polyamides, polyesters, polyolefins, or a mixture thereof.
69. The method of any of Aspects 50-68, wherein the article is an article of apparel, a component of an article of apparel, an article of sporting equipment, or a component of an article of sporting equipment.

70. The method of Aspect 69, wherein the article is a garment, a component of a garment, an article of footwear or a component of an article of footwear.

71. The method of Aspect 70, wherein the article is an article of footwear comprising an outsole and an upper, wherein the element is the outsole or a component of the outsole.

72. An article comprising:
an element having a shape including a surface, wherein at least a portion of the surface of the element is defined by a fully cured or partially cured UV radiation curable elastomeric material; and
a substrate having a surface; wherein the at least a portion of the surface of the element and the surface of the substrate are affixed to each other by bonds formed by exposure to UV radiation of a precursor material to the fully cured or partially cured UV radiation curable elastomeric material.

73. The article of Aspect 72, wherein the partially cured UV radiation curable elastomeric material or the fully cured UV radiation curable material includes an UV radiation curable rubber.

74. The article of Aspect 73, wherein the UV radiation curable rubber includes an UV radiation curable polyurethane rubber.

75. The article of any of Aspects 72-74, wherein the partially cured UV radiation curable elastomeric material further comprises one or more photoinitiators.

76. The article of Aspect 75, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

77. The article of any of Aspects 72-76, wherein the partially cured UV radiation curable elastomeric material or the fully cured UV radiation cured elastomeric material further comprises one or more processing aids.

78. The article of Aspect 77 wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

79. The article of any of Aspects 72-78, wherein the substrate comprises one or more materials, the one or more materials including leather, thermoset polymers, thermoplastic polymers, and combinations thereof.

80. The article of Aspect 79, wherein the thermoplastic polymers include thermoplastic polyurethanes (TPUs), polyamides, polyesters, polyolefins, and mixtures thereof.

81. The article of any of Aspects 72-80, wherein the substrate comprises one or more textiles, the one or more textiles including knit textiles, woven textiles, non-woven textiles, braided textiles, and combinations thereof.

82. The article of Aspect 81, wherein the one or more textile is formed from one or more natural or synthetic fibers or natural or synthetic yarns.

83. The article of Aspect 82, wherein the synthetic fibers or yarns are formed from a polymeric material comprising thermoplastic polyurethanes (TPUs), polyamides, polyesters, polyolefins, or a mixture thereof.

84. The article of any of Aspects 72-83, wherein the article is an article of apparel, a component of an article of apparel, an article of sporting equipment, or a component of an article of sporting equipment.

85. The article of any of Aspects 72-84, wherein the article is a garment, a component of a garment, an article of footwear or a component of an article of footwear.

86. The article of any of Aspect 85, wherein the article is an article of footwear comprising an outsole and an upper, wherein the element is the outsole or a component of the outsole.

87. The article of any of Aspects 72-86, wherein the article is formed according to the method of any of Aspects 48-69.

88. A method of manufacturing an article, comprising:
providing an element formed of a composite, the composite having a first region formed of fully cured or partially cured UV radiation curable elastomeric material affixed to a second region formed of an adhesive material, the second region formed of the adhesive material defining at least a portion of a surface of the element;
placing the at least a portion of the surface of the element in contact with a surface of a substrate; and
affixing the element to the substrate by increasing a temperature of the at least a portion of the surface of the element above a melting point of the adhesive material while the at least a portion of the element is in contact with the surface of the substrate, forming a bond between the surface of the element and the surface of the substrate, thereby forming the article.

89. The method of Aspect 88, further comprising affixing the element to the substrate by applying pressure to at least a portion of the adhesive material of the composite while the at least a portion of the adhesive material is in contact with the surface of the substrate.

90. The method of any of Aspects 88-89, wherein the partially cured UV radiation curable elastomeric material or the fully cured UV radiation curable material includes an UV radiation curable rubber.

91. The method of Aspect 90, wherein the UV radiation curable rubber includes an UV radiation curable polyurethane rubber.

92. The method of any of Aspects 88-91, wherein the partially cured UV radiation curable elastomeric material further comprises one or more photoinitiators.

93. The method of Aspect 92, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

94. The method of any of Aspects 88-93, wherein the partially cured UV radiation curable elastomeric material or the fully cured UV radiation cured elastomeric material further comprises one or more processing aids.

95. The method of Aspect 94, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

96. The method of Aspect 95, wherein the adhesive material is a hot melt adhesive.

97. The method of Aspect 96, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

98. The method of any of Aspects 96-97, wherein the hot melt adhesive further comprises on or more additives.

99. The method of Aspect 98, wherein the additives are independently selected from the group consisting of tackifying resins, waxes, plasticizers, antioxidants, UV stabilizers, pigments, dyes, biocides, flame retardants, antistatic agents, and filler materials.

100. The method of any of Aspects 88-99, wherein the composite has a predetermined shape, the predetermined shape formed by molding, cutting or trimming the elastomeric material.

101. The method of Aspect 100, wherein the composite is a multilayered sheet or film and the shaping of the composite comprises:

placing the composite in contact with a surface that corresponds to the shape; and using heat, pressure, or both to conform the composite to the shape.

102. The method of Aspect 99, wherein the surface that corresponds to the shape is part of a compression mold.

103. The method of any of Aspects 101-102, wherein the multilayered sheet or film is formed in a co-extrusion process or a lamination process.

104. The method of any of Aspects 88-103, wherein the method further comprises protecting at least a portion of the uncured or partially cured UV radiation curable elastomeric material from ultraviolet radiation during one or more steps of the method.

105. The method of any of Aspects 88-104, wherein the substrate is formed from one or more materials, the one or more materials including leather, thermoset polymers, thermoplastic polymers, and combinations thereof.

106. The method of Aspect 105, wherein the thermoplastic polymers include thermoplastic polyurethanes (TPUs), polyamides, polyesters, polyolefins, and mixtures thereof.

107. The method of any of Aspects 88-106, wherein the surface of the element is placed in contact with a portion of the substrate including a textile formed from a polymeric material comprising one or more thermoplastic polyurethanes (TPUs).

108. The method of any of Aspects 88-107, wherein the substrate is formed from one or more textiles, the one or more textiles including knit textiles, woven textiles, non-woven textiles, braided textiles, and combinations thereof.

109. The method of Aspect 108, wherein the one or more textile is formed from one or more natural or synthetic fibers or natural or synthetic yarns.

110. The method of Aspect 109, wherein the synthetic fibers or yarns are formed from a polymeric material comprising thermoplastic polyurethanes (TPUs), polyamides, polyesters, polyolefins, or a mixture thereof.

111. The method of any of Aspects 88-110, wherein the article is an article of apparel, a component of an article of apparel, an article of sporting equipment, or a component of an article of sporting equipment.

112. The method of Aspect 111, wherein the article is a garment, a component of a garment, an article of footwear or a component of an article of footwear.

113. The method of Aspect 112, wherein the article is an article of footwear comprising an outsole and an upper, wherein the element is the outsole or a component of the outsole.

114. An article comprising:

an element formed of a composite, the composite having a first region formed of fully cured or partially cured UV radiation curable elastomeric material affixed to a second region formed of an adhesive material, the second region formed of the adhesive material defining at least a portion of a surface of the element; and a substrate having a surface; wherein the at least a portion of the surface of the element and the surface of the substrate are affixed to each other by the adhesive material.

115. The article of Aspect 114, wherein at least one physical bond exists between the adhesive material and the surface of the substrate 116. The article of any of Aspects 114-115, wherein the partially cured UV radiation curable elastomeric material or the fully cured UV radiation curable material includes an UV radiation curable rubber.

117. The article of Aspect 116, wherein the UV radiation curable rubber includes an UV radiation curable polyurethane rubber.

118. The article of any of Aspects 114-117, wherein the partially cured UV radiation curable elastomeric material further comprises one or more photoinitiators.

119. The article of Aspect 118, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

120. The article of any of Aspects 114-119, wherein the partially cured UV radiation curable elastomeric material or the fully cured UV radiation cured elastomeric material further comprises one or more processing aids.

121. The article of Aspect 120, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

122. The article of any of Aspects 114-121, wherein the adhesive material is a hot melt adhesive.

123. The article of Aspect 122, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

124. The article of any of Aspects 114-123, wherein the hot melt adhesive further comprises on or more additives.

125. The article of Aspect 124, wherein the additives are independently selected from the group consisting of tackifying resins, waxes, plasticizers, antioxidants, UV stabilizers, pigments, dyes, biocides, flame retardants, antistatic agents, and filler materials.

126. The article of any of Aspects 114 to 125, wherein the element is an element having a predetermined shape, the predetermined shape formed by molding, cutting or trimming the elastomeric material.

127. The article of any of Aspects 114-126, wherein the substrate comprises one or more materials, the one or more materials including leather, thermoset polymers, thermoplastic polymers, and combinations thereof.

128. The article of Aspect 127, wherein the thermoplastic polymers include thermoplastic polyurethanes (TPUs), polyamides, polyesters, polyolefins, and mixtures thereof.

129. The article of any of Aspects 114-128, wherein the substrate comprises one or more textiles, the one or more textiles including knit textiles, woven textiles, non-woven textiles, braided textiles, and combinations thereof.

130. The article of Aspect 129, wherein the one or more textile is formed from one or more natural or synthetic fibers or natural or synthetic yarns.

131. The article of Aspect 130, wherein the synthetic fibers or yarns are formed from a polymeric material comprising thermoplastic polyurethanes (TPUs), polyamides, polyesters, polyolefins, or a mixture thereof.

132. The article of any of Aspects 114-131, wherein the article is an article of apparel, a component of an article of apparel, an article of sporting equipment, or a component of an article of sporting equipment.

133. The article of any of Aspects 114-132, wherein the article is a garment, a component of a garment, an article of footwear or a component of an article of footwear.

134. The article of any of Aspect 133, wherein the article is an article of footwear comprising an outsole and an upper, wherein the element is the outsole or a component of the outsole.

135. The article of any of Aspects 114-134, wherein the article is formed according to the method of any of Aspects 86-111.

136. A method of forming a cured composite, the method comprising:
providing an uncured or partially cured ultraviolet (UV) radiation curable elastomeric material;
shaping the uncured or partially cured UV radiation curable elastomeric material to have a surface;
affixing one or more regions of an adhesive material to the surface of the uncured or partially cured UV radiation curable elastomeric material, forming an uncured composite; and
exposing at least a portion of the uncured composite to UV radiation in a sufficient amount for a sufficient duration of time to partially cure the uncured UV radiation curable elastomeric material, or to fully cure the partially cured UV radiation curable elastomeric material, forming the cured composite.

137. The method of Aspect 136, further comprising affixing the adhesive material to the uncured or partially cured UV radiation curable material by applying pressure to at least a portion of the adhesive material while the at least a portion of the adhesive material is in contact with the surface of the uncured or partially cured UV radiation curable material.

138. The method of any of Aspects 136-137, wherein the uncured UV radiation curable elastomeric material or the partially cured UV radiation curable material includes an UV radiation curable rubber.

139. The method of Aspect 138, wherein the UV radiation curable rubber includes an UV radiation curable polyurethane rubber.

140. The method of any of Aspects 136-139, wherein the uncured or partially cured UV radiation curable elastomeric material further comprises one or more photoinitiators.

141. The method of Aspect 140, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing compounds.

142. The method of any of Aspects 136-141, wherein the uncured UV radiation curable elastomeric material or the partially cured UV radiation cured elastomeric material further comprises one or more processing aids.

143. The method of Aspect 142, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

144. The method of any of Aspects 136-143, wherein the adhesive material is a hot melt adhesive.

145. The method of Aspect 137, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

146. The method of any of Aspects 144-145, wherein the hot melt adhesive further comprises on or more additives.

147. The method of Aspect 146, wherein the additives are independently selected from the group consisting of tackifying resins, waxes, plasticizers, antioxidants, UV stabilizers, pigments, dyes, biocides, flame retardants, antistatic agents, and filler materials.

148. The method of any of Aspects 136-99, shaping the uncured or partially cured UV radiation curable elastomeric material includes molding, cutting or trimming the elastomeric material.

149. The method of Aspect 148, wherein the uncured or partially cured UV radiation curable material and the adhesive form an uncured or partially cured composite, the uncured or partially cured composite being a multilayered sheet or film and the shaping of the uncured or partially cured UV radiation curable material comprises:
placing the uncured or partially cured composite in contact with a surface that corresponds to the shape; and
using heat, pressure, or both to conform the uncured or partially cured composite to the shape.

150. The method of Aspect 149, wherein the surface that corresponds to the shape is part of a compression mold.

151. The method of any of Aspects 149-150, wherein the multilayered sheet or film is formed in a co-extrusion process or a lamination process.

152. The method of any of Aspects 136-151, wherein the method further comprises protecting at least a portion of the uncured or partially cured UV radiation curable elastomeric material from ultraviolet radiation during one or more steps of the method.

153. The method of any of Aspects 136-152, wherein the method further comprises affixing the cured composite to a substrate; wherein the substrate is formed from one or more materials, the one or more materials including leather, thermoset polymers, thermoplastic polymers, and combinations thereof.

154. The method of Aspect 153, wherein the thermoplastic polymers include thermoplastic polyurethanes (TPUs), polyamides, polyesters, polyolefins, and mixtures thereof.

155. The method of any of Aspects 153-154, wherein the surface of the adhesive material is placed in contact with a portion of the substrate including a textile formed from a polymeric material comprising one or more thermoplastic polyurethanes (TPUs).

156. The method of any of Aspects 153-155, wherein the substrate is formed from one or more textiles, the one or more textiles including knit textiles, woven textiles, nonwoven textiles, braided textiles, and combinations thereof.

157. The method of Aspect 156, wherein the one or more textile is formed from one or more natural or synthetic fibers or natural or synthetic yarns.

158. The method of Aspect 157, wherein the synthetic fibers or yarns are formed from a polymeric material comprising thermoplastic polyurethanes (TPUs), polyamides, polyesters, polyolefins, or a mixture thereof.

159. The method of any of Aspects 136-158, wherein the cured composite is an article of apparel, a component of an article of apparel, an article of sporting equipment, or a component of an article of sporting equipment.

160. The method of Aspect 159, wherein the cured composite is a garment, a component of a garment, an article of footwear or a component of an article of footwear.

161. The method of Aspect 160, wherein the article of footwear comprises an outsole and an upper, wherein the cured composite is the outsole or a component of the outsole.

162. A cured composite, comprising:
 a fully cured or partially cured UV radiation curable elastomeric material having a shape and a surface; and
 one or more regions of an adhesive material affixed to the surface;
 wherein the one or more regions of the adhesive material are affixed to the surface by bonds formed by exposure to UV radiation of a precursor material to the fully cured or partially cured UV radiation curable elastomeric material.

163. The cured composite of Aspect 162, wherein at least one chemical bond exists between the adhesive material and the surface of the fully cured or partially cured UV radiation curable elastomeric material.

164. The cured composite of any of Aspects 162-163, wherein the partially cured UV radiation curable elastomeric material or the fully cured UV radiation curable material includes an UV radiation curable rubber.

165. The cured composite of Aspect 164, wherein the UV radiation curable rubber includes an UV radiation curable polyurethane rubber.

166. The cured composite of any of Aspects 162-165, wherein the partially cured UV radiation curable elastomeric material further comprises one or more photoinitiators.

167. The cured composite of Aspect 166, wherein the photoinitiators are independently selected from the group consisting of phosphine oxides, benzophenones, a-hydroxy-alkyl aryl ketones, thioxanthones, anthraquinones, acetophenones, benzoins and benzoin ethers, ketals, imidazoles, phenylglyoxylic acids, peroxides, and sulfur-containing corn pounds.

168. The cured composite of any of Aspects 162-167, wherein the partially cured UV radiation curable elastomeric material or the fully cured UV radiation cured elastomeric material further comprises one or more processing aids.

169. The cured composite of Aspect 168, wherein the processing aids are independently selected from the group consisting of plasticizers, mold release agents, lubricants, antioxidants, flame retardants, dyes, pigments, reinforcing and non-reinforcing fillers, fiber reinforcements, and light stabilizers.

170. The cured composite of any of Aspects 162-169, wherein the adhesive material is a hot melt adhesive.

171. The cured composite of Aspect 170, wherein the hot melt adhesive is selected as one from the group consisting of ethylene-vinyl acetate polymers, polyolefins, polyamides, polyesters, polyurethanes, styrene block copolymers, polycaprolactone, polycarbonates, fluoropolymers, silicones, and mixtures or copolymers thereof.

172. The cured composite of any of Aspects 170-171, wherein the hot melt adhesive further comprises on or more additives.

173. The cured composite of Aspect 172, wherein the additives are independently selected from the group consisting of tackifying resins, waxes, plasticizers, antioxidants, UV stabilizers, pigments, dyes, biocides, flame retardants, antistatic agents, and filler materials.

174. The cured composite of any of Aspects 162 to 173, wherein the shape of the partially cured or fully cured UV radiation curable elastomeric material is formed by molding, cutting or trimming the elastomeric material.

175. The cured composite of any of Aspects 162-174, wherein the adhesive material is further affixed to a substrate comprising one or more materials, the one or more materials including leather, thermoset polymers, thermoplastic polymers, and combinations thereof.

176. The cured composite of Aspect 175, wherein the thermoplastic polymers include thermoplastic polyurethanes (TPUs), polyamides, polyesters, polyolefins, and mixtures thereof.

177. The cured composite of any of Aspects 175-176, wherein the substrate comprises one or more textiles, the one or more textiles including knit textiles, woven textiles, non-woven textiles, braided textiles, and combinations thereof.

178. The cured composite of Aspect 177, wherein the one or more textile is formed from one or more natural or synthetic fibers or natural or synthetic yarns.

179. The cured composite of Aspect 178, wherein the synthetic fibers or yarns are formed from a polymeric material comprising thermoplastic polyurethanes (TPUs), polyamides, polyesters, polyolefins, or a mixture thereof.

180. The cured composite of any of Aspects 162-179, wherein the cured composite is used in an article of apparel, a component of an article of apparel, an article of sporting equipment, or a component of an article of sporting equipment.

181. The cured composite of any of Aspects 162-180, wherein the cured composite is used in a garment, a component of a garment, an article of footwear or a component of an article of footwear.

182. The cured composite of Aspect 181, wherein the article of footwear comprises an outsole and an upper, wherein the cured composite is the outsole or a component of the outsole.

183. The cured composite of any of Aspects 162-182, wherein the cured composite is formed according to the method of any of Aspects 136-161.

184. A method of manufacturing an article, the method comprising:
 providing an element comprising the cured composite of any of aspects 160 to 172, the one or more regions of the adhesive material of the cured composite element at least partially defining a surface of the element;
 providing a substrate having a surface,
 placing the at least one region of the adhesive material of the element in contact with the surface of the substrate; and
 affixing the at least one region of the surface of element to the surface of the substrate by increasing the temperature of the at least one region of the element or applying pressure to the at least one region of the element or both while the at least one region of the element and the surface of the substrate are in contact, forming a bond between the at least one region of the element and the substrate, thereby forming the article.

185. The method of Aspect 184, wherein the substrate comprises one or more materials, the one or more materials including leather, thermoset polymers, thermoplastic polymers, and combinations thereof.

186. The method of Aspect 185, wherein the thermoplastic polymers include thermoplastic polyurethanes (TPUs), polyamides, polyesters, polyolefins, and mixtures thereof.

187. The method of any of Aspects 185-186, wherein the substrate comprises one or more textiles, the one or more textiles including knit textiles, woven textiles, non-woven textiles, braided textiles, and combinations thereof.

188. The method of Aspect 187, wherein the one or more textile is formed from one or more natural or synthetic fibers or natural or synthetic yarns.

189. The method of Aspect 188, wherein the synthetic fibers or yarns are formed from a polymeric material comprising thermoplastic polyurethanes (TPUs), polyamides, polyesters, polyolefins, or a mixture thereof.

190. The method of any of Aspects 184-189, wherein the article is an article of apparel, a component of an article of apparel, an article of sporting equipment, or a component of an article of sporting equipment.

191. The method of any of Aspects 184-190, wherein the article is a garment, a component of a garment, an article of footwear or a component of an article of footwear.

192. The method of Aspect 191, wherein the article is an article of footwear comprising an outsole and an upper, wherein the cured composite is the outsole or a component of the outsole.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of manufacturing an article of footwear, comprising:
    providing an element having a surface including a layer of a first elastomeric material in a first area, the first elastomeric material including a first uncured ultraviolet (UV) radiation curable elastomeric material, or a first partially cured UV radiation curable elastomeric material, or a first fully cured UV radiation curable elastomeric material, the element having a surface, wherein the first elastomeric material includes a UV radiation curable millable polyurethane gum;
    placing the first area of the element in contact with a second area of an upper, wherein the second area is an area of the surface of the upper, and the second area comprises a layer of a second elastomeric material, wherein the second elastomeric material includes a second uncured UV radiation curable elastomeric material, or a second partially cured UV radiation curable elastomeric material, or a second fully cured UV radiation curable elastomeric material;
    increasing a temperature of at least a portion of the surface of the element, applying pressure to the at least a portion of the first area while the first area is in contact with the second area, or both; and
    affixing the surface of the element to the surface of the upper by forming a bond between the first elastomeric material of the first area of the element and the second elastomeric material of the second area of the upper, thereby forming the article of footwear having the element attached to the upper.

2. The method of claim 1, wherein the element further includes a layer of an adhesive material on a third area of the surface of the element, where the first area and the third area are different areas of the surface of the element;
    wherein the surface of the upper further includes a fourth area, and the second area and the fourth area are different areas of the upper;
    the method further comprises a step of placing the third area of the element in contact with the fourth area of the upper;
    the method includes the step of increasing the temperature of at least a portion of the third area to a temperature at or above a melting point of the adhesive material;
    the increasing the temperature is performed concurrently with or prior to the placing the third area of the element in contact with the fourth area of the upper;
    the method includes applying pressure to at least a portion of the third area while the third area of the element is in contact with the fourth area of the upper;
    after the increasing the temperature, the method further includes decreasing the temperature of the at least the third area to a temperature below the melting point of the adhesive material while the at least a portion of the third area of the element remains in contact with the fourth area of the upper; and
    the affixing includes forming a physical bond between the adhesive material of the third area and the fourth area of the upper.

3. The method of claim 2, wherein the adhesive material is a hot melt adhesive.

4. The method of claim 1, wherein the second area includes a portion of the upper including a textile.

5. The method of claim 4, wherein the textile includes fibers comprising a polymeric material, the polymeric material comprising one or more thermoplastic polyurethanes (TPUs).

6. The method of claim 1, wherein the first area includes the first uncured UV radiation curable elastomeric material, or the first partially cured UV radiation curable elastomeric material;
    the method includes the applying pressure;
    the affixing is performed concurrently with or following the applying the pressure; and
    the affixing includes exposing the at least a portion of the first area of the element to UV radiation in an sufficient amount for a sufficient duration of time to at least partially cure the first uncured UV radiation curable elastomeric material or to fully cure the first partially cured UV radiation curable elastomeric material of the element, and to form chemical bonds between the first partially cured UV radiation curable elastomeric material, or the first fully cured UV radiation curable elastomeric material of the element, and the second material of the upper.

7. The method of claim 1, wherein the first elastomeric material further comprises one or more photoinitiators.

8. The method of claim 1, wherein the element is an element having a shape, the shape formed by molding, cutting or trimming the first elastomeric material.

9. The method of claim 1, wherein the second elastomeric material includes a UV radiation curable millable polyurethane gum.

10. The method of claim 1, wherein the second elastomeric material further comprises one or more photoinitiators.

11. The method of claim 1, wherein the method comprises increasing the temperature of the at least a portion of the first area of the element.

12. The method of claim 1, wherein the method comprises the applying pressure to the at least a portion of the first area while the first area is in contact with the second area.

13. The method of claim 1, wherein the method comprises increasing the temperature of the at least a portion of the first area of the element, and the applying pressure to the at least a portion of the first area while the first area is in contact with the second area, and the applying pressure is performed subsequently or concurrently with the increasing the temperature.

14. The method of claim 1, wherein the first elastomeric material comprises the first uncured UV radiation curable elastomeric material.

15. The method of claim 1, wherein the first elastomeric material comprises the first partially cured UV radiation curable elastomeric material.

16. The method of claim 1, wherein the first elastomeric material comprises the first fully cured UV radiation curable elastomeric material.

17. The method of claim 1, wherein the second elastomeric material comprises the second uncured UV radiation curable elastomeric material.

18. The method of claim 1, wherein the second elastomeric material comprises the second partially cured UV radiation curable elastomeric material.

19. The method of claim 1, wherein the second elastomeric material comprises the second fully cured UV radiation curable elastomeric material.

* * * * *